US012795010B2

(12) United States Patent
Kim et al.

(10) Patent No.: US 12,795,010 B2
(45) Date of Patent: Nov. 10, 2026

(54) ELECTRONIC APPARATUS INCLUDING PLATE SUPPORTED BY SUPPORT BAR

(71) Applicant: SAMSUNG ELECTRONICS CO., LTD., Suwon-si (KR)

(72) Inventors: Taejeong Kim, Suwon-si (KR); Kiju Nam, Suwon-si (KR); Byounggyu Park, Suwon-si (KR); Garam Lee, Suwon-si (KR); Hosoon Lee, Suwon-si (KR); Kyunghwan Song, Suwon-si (KR); Sanghoon Kim, Suwon-si (KR); Kidoc Son, Suwon-si (KR); Hyunsuk Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 124 days.

(21) Appl. No.: 18/988,166

(22) Filed: Dec. 19, 2024

(65) Prior Publication Data

US 2025/0119488 A1 Apr. 10, 2025

Related U.S. Application Data

(63) Continuation of application No. PCT/KR2023/005418, filed on Apr. 20, 2023.

(30) Foreign Application Priority Data

Jun. 20, 2022 (KR) ........................ 10-2022-0074990
Jun. 29, 2022 (KR) ........................ 10-2022-0079860

(51) Int. Cl.
*H04M 1/02* (2006.01)

(52) U.S. Cl.
CPC ....... *H04M 1/0268* (2013.01); *H04M 1/0237* (2013.01)

(58) Field of Classification Search
CPC ... H04M 1/0268; H04M 1/0237; G09F 9/301; G06F 1/1624; G06F 1/1637; G06F 1/1652
See application file for complete search history.

(56) References Cited

U.S. PATENT DOCUMENTS 8,711,566 B2 4/2014 O'Brien
10,532,428 B2 1/2020 Russell-Clarke et al.
(Continued)

FOREIGN PATENT DOCUMENTS

EP 3 301 506 A1 4/2018
EP 3 893 093 A1 10/2021
(Continued)

OTHER PUBLICATIONS

Communication dated Aug. 4, 2025, issued by the European Patent Office in counterpart European Application No. 23827349.4.
(Continued)

*Primary Examiner* — Lisa Lea-Edmonds
(74) *Attorney, Agent, or Firm* — Sughrue Mion, PLLC

(57) ABSTRACT

Provided is an electronic device including: a first housing; a second housing movably connected to the first housing; a support plate comprising a flexible region, the flexible region comprising a plurality of flexible portions and a plurality of rigid portions integrally formed with the flexible portions; and a display supported by the support plate. Each of the flexible portions comprises a plurality of slits. A first width of at least one of the plurality of slits is wider than a second width of at least one of the plurality of slits. The first width of the at least one of the plurality of slits corresponds a first side of the plurality of slits closer to the display. The second width of the at least one of the plurality of slits corresponds to a second side of the plurality of slits opposite to the first side.

20 Claims, 16 Drawing Sheets

(56) References Cited

U.S. PATENT DOCUMENTS

| | | | | |
|---|---|---|---|---|
| 10,887,438 | B2 | 1/2021 | Baek et al. | |
| 11,012,546 | B1 | 5/2021 | Song et al. | |
| 11,058,018 | B1 * | 7/2021 | Yoon | G06F 1/1624 |
| 11,176,851 | B2 | 11/2021 | Wang et al. | |
| 11,528,819 | B2 | 12/2022 | Lee | |
| 11,693,452 | B2 * | 7/2023 | Kwak | H04M 1/0237 361/679.01 |
| 11,805,605 | B2 * | 10/2023 | Yoon | G06F 1/1624 |
| 11,860,694 | B2 * | 1/2024 | Shin | G06F 1/1637 |
| 11,940,842 | B2 * | 3/2024 | Kang | G06F 1/1652 |
| 12,192,393 | B2 * | 1/2025 | Choi | H04M 1/0268 |
| 12,279,388 | B2 * | 4/2025 | Kim | G06F 1/1652 |
| 12,376,242 | B2 * | 7/2025 | Cho | G06F 1/1624 |
| 12,411,524 | B2 * | 9/2025 | Park | G06F 1/1652 |
| 12,446,198 | B2 * | 10/2025 | Cho | H04M 1/0268 |
| 12,500,331 | B2 * | 12/2025 | Seol | H01Q 1/243 |
| 12,517,553 | B2 * | 1/2026 | Ahn | G06F 1/1652 |
| 2021/0168953 | A1 | 6/2021 | Lee | |
| 2021/0286407 | A1 | 9/2021 | Kim et al. | |
| 2021/0295749 | A1 | 9/2021 | Hiroki et al. | |
| 2022/0036774 | A1 | 2/2022 | Wang et al. | |
| 2022/0100236 | A1 * | 3/2022 | Kwak | G06F 1/1624 |
| 2022/0113765 | A1 * | 4/2022 | Kang | G06F 1/1652 |
| 2022/0117100 | A1 * | 4/2022 | Yoon | G06F 1/1624 |
| 2022/0183173 | A1 * | 6/2022 | Kim | G06F 1/1652 |
| 2022/0253103 | A1 | 8/2022 | Choi et al. | |
| 2022/0342448 | A1 * | 10/2022 | Shin | G06F 1/1624 |
| 2023/0007796 | A1 * | 1/2023 | Ahn | C09J 9/00 |
| 2023/0099802 | A1 * | 3/2023 | An | G06F 1/1652 455/566 |
| 2023/0259167 | A1 * | 8/2023 | Ahn | G06F 1/1652 |
| 2023/0288962 | A1 * | 9/2023 | Kwak | H04M 1/0237 |
| 2023/0352814 | A1 * | 11/2023 | An | H01Q 1/243 |
| 2023/0389243 | A1 * | 11/2023 | Cho | H05K 5/0217 |
| 2023/0403807 | A1 * | 12/2023 | Park | G06F 1/1652 |
| 2024/0063528 | A1 * | 2/2024 | Seol | H01Q 1/243 |
| 2024/0089357 | A1 * | 3/2024 | Park | G06F 1/1652 |
| 2024/0430351 | A1 * | 12/2024 | Jung | G06F 1/1652 |
| 2025/0023967 | A1 * | 1/2025 | Baik | H04M 1/0235 |
| 2025/0024615 | A1 * | 1/2025 | Cho | G06F 1/1624 |
| 2025/0028354 | A1 * | 1/2025 | Lee | G06F 1/1624 |
| 2025/0030789 | A1 * | 1/2025 | Cho | H04M 1/0268 |
| 2025/0053204 | A1 * | 2/2025 | Bae | G06F 1/1656 |
| 2025/0076933 | A1 * | 3/2025 | Lee | G06F 1/1652 |
| 2025/0119488 | A1 * | 4/2025 | Kim | G06F 1/1637 |
| 2025/0211660 | A1 * | 6/2025 | Son | G06F 1/1624 |
| 2025/0227901 | A1 * | 7/2025 | Cho | H04M 1/0237 |
| 2025/0240903 | A1 * | 7/2025 | Kim | G06F 1/1652 |
| 2025/0301579 | A1 * | 9/2025 | Ahn | H04M 1/0237 |
| 2025/0338410 | A1 * | 10/2025 | Cho | G06F 1/1624 |
| 2025/0343849 | A1 * | 11/2025 | Kim | G09F 9/301 |
| 2026/0051649 | A1 * | 2/2026 | Seo | H01Q 1/243 |
| 2026/0095518 | A1 * | 4/2026 | Bae | H04M 1/0266 |
| 2026/0122868 | A1 * | 4/2026 | Kim | H04M 1/0237 |
| 2026/0135936 | A1 * | 5/2026 | Kim | G06F 1/1652 |

FOREIGN PATENT DOCUMENTS

| | | | |
|---|---|---|---|
| KR | 10-2021-0067292 | A | 6/2021 |
| KR | 10-2021-0070673 | A | 6/2021 |
| KR | 10-2021-0141185 | A | 11/2021 |
| KR | 10-2022-0008732 | A | 1/2022 |
| KR | 10-2366515 | B1 | 2/2022 |
| KR | 10-2022-0035089 | A | 3/2022 |
| KR | 10-2022-0037875 | A | 3/2022 |
| KR | 10-2022-0068132 | A | 5/2022 |
| WO | 2020/184988 | A1 | 9/2020 |

OTHER PUBLICATIONS

International Search Report (PCT/ISA/210) issued on Aug. 1, 2023 by the International Searching Authority in International Patent Application No. PCT/KR2023/005418.

Written Opinion (PCT/ISA/237) issued on Aug. 1, 2023 by the International Searching Authority in International Patent Application No. PCT/KR2023/005418.

Office Action issued Aug. 4, 2026 by the Korean Ministry of Intellectual Property for KR Patent Application No. 10-2022-0079860.

* cited by examiner

ELECTRONIC APPARATUS INCLUDING PLATE SUPPORTED BY SUPPORT BAR

CROSS-REFERENCE TO RELATED APPLICATIONS

This application is a by-pass continuation of International Application No. PCT/KR2023/005418, filed on Apr. 20, 2023, which is based on and claims priority to Korean Patent Application No. 10-2022-0074990, filed on Jun. 20, 2022, in the Korean Intellectual Property Office, and Korean Patent Application No. 10-2022-0079860, filed on Jun. 29, 2022, in the Korean Intellectual Property Office, the disclosures of which are incorporated by reference herein in their entireties.

BACKGROUND

1. Field

The present disclosure relates to an electronic apparatus including a plate supported by a support bar.

2. Description of Related Art

According to a demand for a new design, an electronic device with various forms of a form factor (e.g., foldable device and rollable device) is being supplied to a market. An electronic device providing various forms of the form factor may include a flexible display capable of changing shape through a change of the electronic device. The electronic device may further include a support plate for supporting the flexible display.

SUMMARY

A support plate may include a lattice structure at a deformable portion. Even when the support plate includes the lattice structure for providing flexibility, damage to the support plate or a display may occur through a repulsive force generated by deformation of the support plate. In order to reduce the damage, a method for reducing the repulsive force while increasing the flexibility of the support plate is required.

Provided is an electronic device including a structure capable of withstanding a repulsive force due to deformation of a support plate, by increasing a width of a support bar supporting the support plate.

Further provided is an electronic device including a support plate, where a stress applied to the support plate can be reduced by a groove formed in a support plate. Through a reduction in stress, durability of the support plate can increase and damage to the display can be reduced.

According to an aspect of the disclosure, an electronic device may comprise: a first housing; a second housing movably connected to the first housing; a support plate comprising a flexible region, the flexible region comprising a plurality of flexible portions and a plurality of rigid portions integrally formed with the flexible portions; and a display supported by the support plate. Each of the flexible portions may comprise a plurality of slits. A first width of at least one of the plurality of slits may be wider than a second width of at least one of the plurality of slits. The first width of the at least one of the plurality of slits may correspond a first side of the plurality of slits closer to the display. The second width of the at least one of the plurality of slits may correspond to a second side of the plurality of slits opposite to the first side.

The plurality of slits may be filled with resin material.

The first width of the at least one of the plurality of slits may be 10% to 30% wider than the second width of the at least one of the plurality of slits.

The first width of the at least one of the plurality of slits may be 20% to 25% wider than the second width of the at least one of the plurality of slits.

The second housing may be rotatably connected to the first housing. The display may be configured to be folded or unfolded by rotation of the second housing with respect to the first housing.

The second housing may be configured to move relative to the first housing in a first direction or a second direction opposite to the first direction. A portion of the display, visually exposed to an outside of the electronic device, may be increased by movement of the second housing in the first direction or reduced by movement of the second housing in the second direction.

The display may include a first region on the second housing and a second region that is the portion of the display visually exposed to the outside of the electronic device. The second region of the display may be configured to bend according to deformation of the display.

A width of at least one of the plurality of rigid portions corresponding to a side of the rigid portion closer to the display may be narrower than a width of the at least one of the plurality of rigid portions corresponding to another side of the rigid portion opposite to the side of the at least one of the plurality of rigid portions.

The electronic device may further comprise a plurality of support bars on the plurality of rigid portions, respectively. A width of at least one of the plurality support bars may correspond to the width of the at least one of the plurality of rigid portions corresponding to the another side of the at least one rigid portion.

The width of the support bar may be wider than the width of the at least one of the plurality rigid portions corresponding to the side of the at least one of the plurality of the rigid portions closer to the display.

The plurality of slits may comprise a first slit and a second slit, wherein the second slit is spaced apart from the first slit in the first direction. The support plate may further comprise a bridge between the first slit and the second slit, the bridge comprising a groove on a surface of the bridge opposite another surface of the bridge facing the display.

The bridge may define a portion of the first slit and a portion of the second slit, and extends in a third direction perpendicular to the first direction.

The groove may extend in the third direction perpendicular to the first direction.

A width of the another surface of the bridge facing the display may be narrower than a width of the surface of the bridge.

The support plate may comprise a continuous surface in a region corresponding to the first region. The plurality of flexible portions and the plurality of rigid portions may be alternately arranged in the flexible region. The flexible region may correspond to the second region.

Each of the plurality of slits may comprise a first sidewall extending in a third direction perpendicular to the first direction and a second sidewall opposite to the first sidewall. The first sidewall may have a first slope relative to a surface of the support plate. The second sidewall may have a second slope relative to the surface of the support plate.

For each of the plurality of slits, the first slope may be symmetrical with the second slope relative to an imaginary line extending in a longitudinal direction of the respective slit.

The first width may widen when the flexible region is bent. The second width may narrow when the flexible region is bent. The support plate may comprise at least one of a polymer, a reinforced plastic, or metal.

According to the above-described embodiment, an electronic device may comprise: a first housing; a second housing movably connected to the first housing, wherein the second housing is configured to move relative to the first housing in a first direction and in a second direction opposite to the first direction; a support plate comprising a flexible region, the flexible region comprising a flexible portion and a rigid portion integrally formed with the flexible portion; and a display supported by the support plate. The flexible portion may comprise a plurality of slits. The plurality of slits may comprise a first slit and a second slit. The second slit may be spaced apart from the first slit in the first direction. The support plate may further comprise a bridge between the first slit and the second slit. The bridge may comprise a groove on a surface of the support plate opposite another surface of the support plate facing the display.

The present disclosure is not limited to features and characteristics described above, and any other effects not mentioned herein will be clearly understood by those having ordinary knowledge in the art to which the present disclosure belongs, from the following description.

BRIEF DESCRIPTION OF THE DRAWINGS

The above and other aspects and features of certain embodiments of the present disclosure will be more apparent from the following description taken in conjunction with the accompanying drawings, in which.

DETAILED DESCRIPTION

Figure 1:
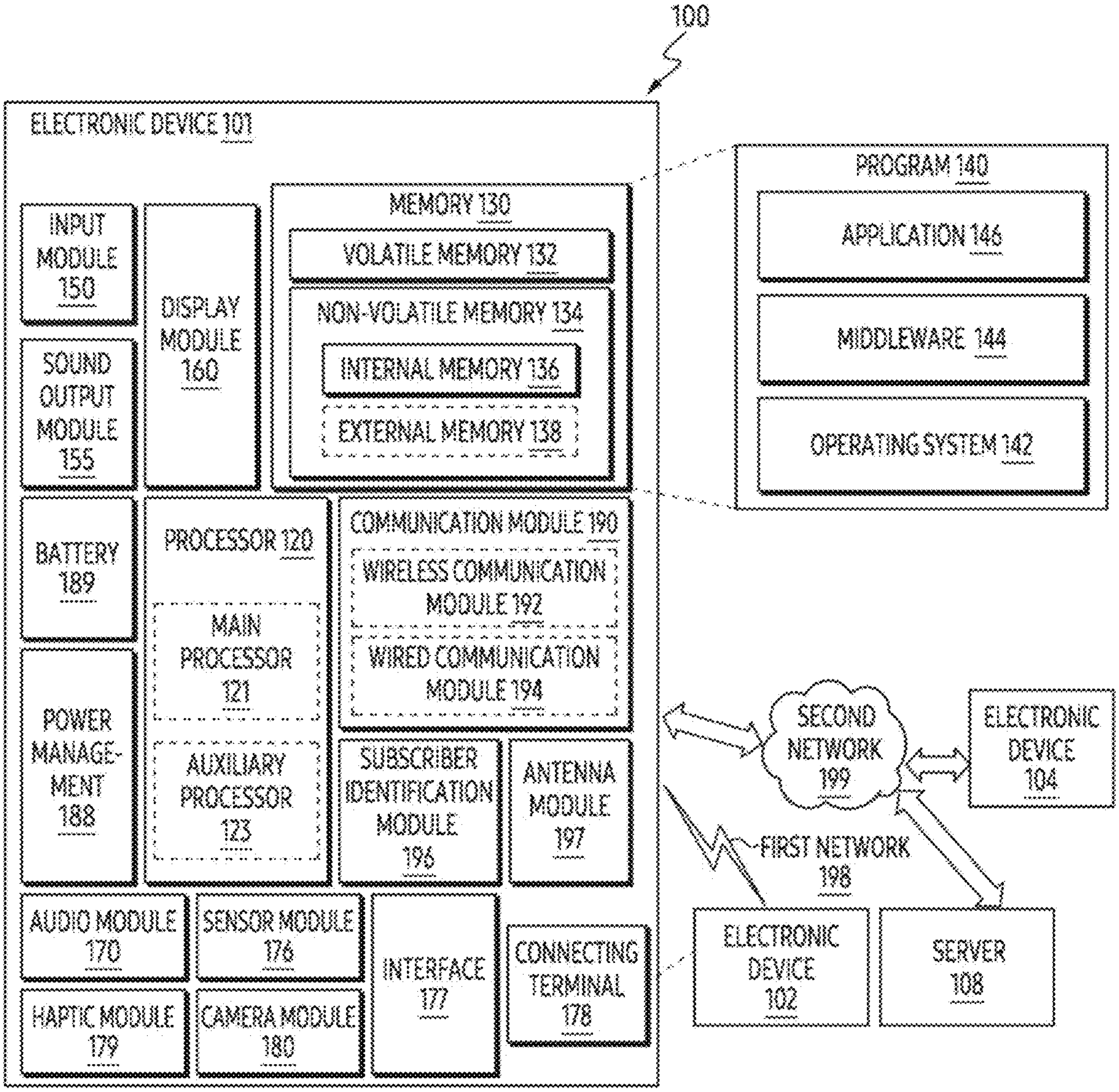
FIG. 1 is a block diagram of an electronic device in a network environment according to one or more embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to one or more embodiments, the electronic device 101 may communicate with the electronic device 104 via the server 108. According to one or more embodiments, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In one or more embodiments, at least one of the components (e.g., the connecting terminal 178) may be omitted from the electronic device 101, or one or more other components may be added in the electronic device 101. In one or more embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one or more embodiments, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to one or more embodiments, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to one or more embodiments, the auxiliary processor 123 (e.g., an image signal processor or a communication processor) may be implemented as part of another component (e.g., the camera module 180 or the communication module 190) functionally related to the auxiliary processor 123. According to one or more embodiments, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to one or more embodiments, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to one or more embodiments, the display module 160 may include a touch sensor adapted to detect a touch, or a pressure sensor adapted to measure the intensity of force incurred by the touch.

The audio module 170 may convert a sound into an electrical signal and vice versa. According to one or more embodiments, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to one or more embodiments, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to one or more embodiments, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to one or more embodiments, the connecting terminal 178 may include, for example, an HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to one or more embodiments, the haptic module 179 may include, for example, a motor, a piezoelectric element, or an electric stimulator.

The camera module 180 may capture a still image or moving images. According to one or more embodiments, the camera module 180 may include one or more lenses, image sensors, image signal processors, or flashes.

The power management module 188 may manage power supplied to the electronic device 101. According to one or more embodiments, the power management module 188 may be implemented as at least part of, for example, a power management integrated circuit (PMIC).

The battery 189 may supply power to at least one component of the electronic device 101. According to one or more embodiments, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to one or more embodiments, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to one or more embodiments, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to one or more embodiments, the antenna module 197 may include an antenna including a radiating element composed of a conductive material or a conductive pattern formed in or on a substrate (e.g., a printed circuit board (PCB)). According to one or more embodiments, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to one or more embodiments, another component (e.g., a radio frequency integrated circuit (RFIC)) other than the radiating element may be additionally formed as part of the antenna module 197.

According to various embodiments, the antenna module 197 may form a mmWave antenna module. According to one or more embodiments, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one or more embodiments, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to one or more embodiments, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to one or more embodiments, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
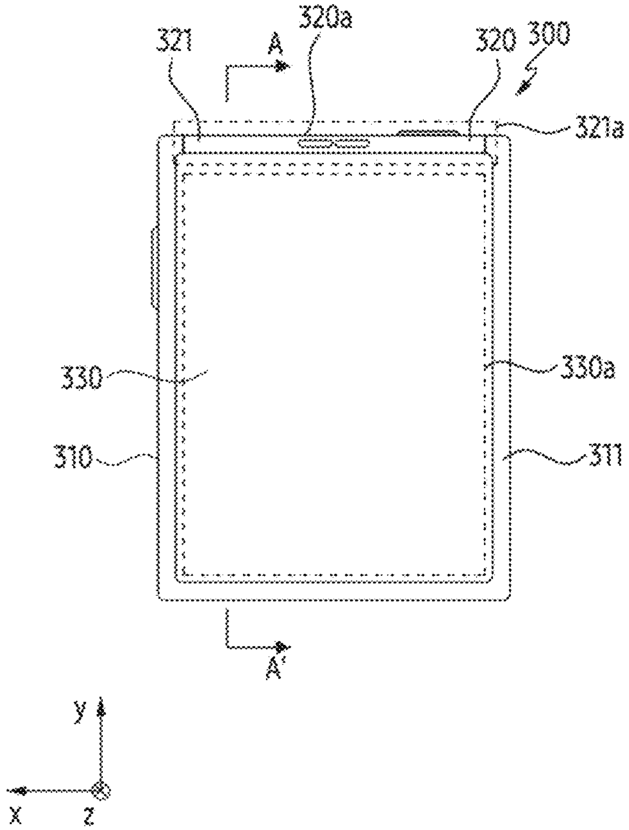
FIG. 2A is a front view of a first state of an electronic device according to one or more embodiments of the disclosure.
Figure 2B:
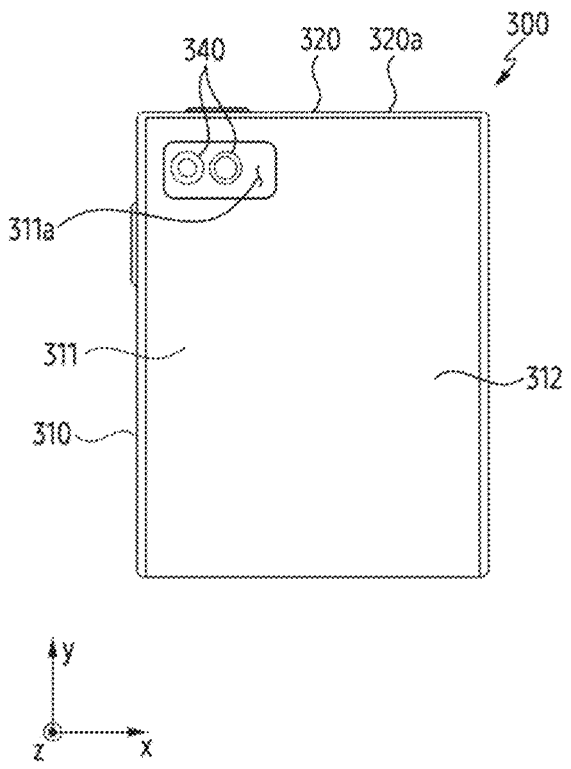
FIG. 2B is a rear view of a first state of an electronic device according to one or more embodiments of the disclosure.
Figure 2C:
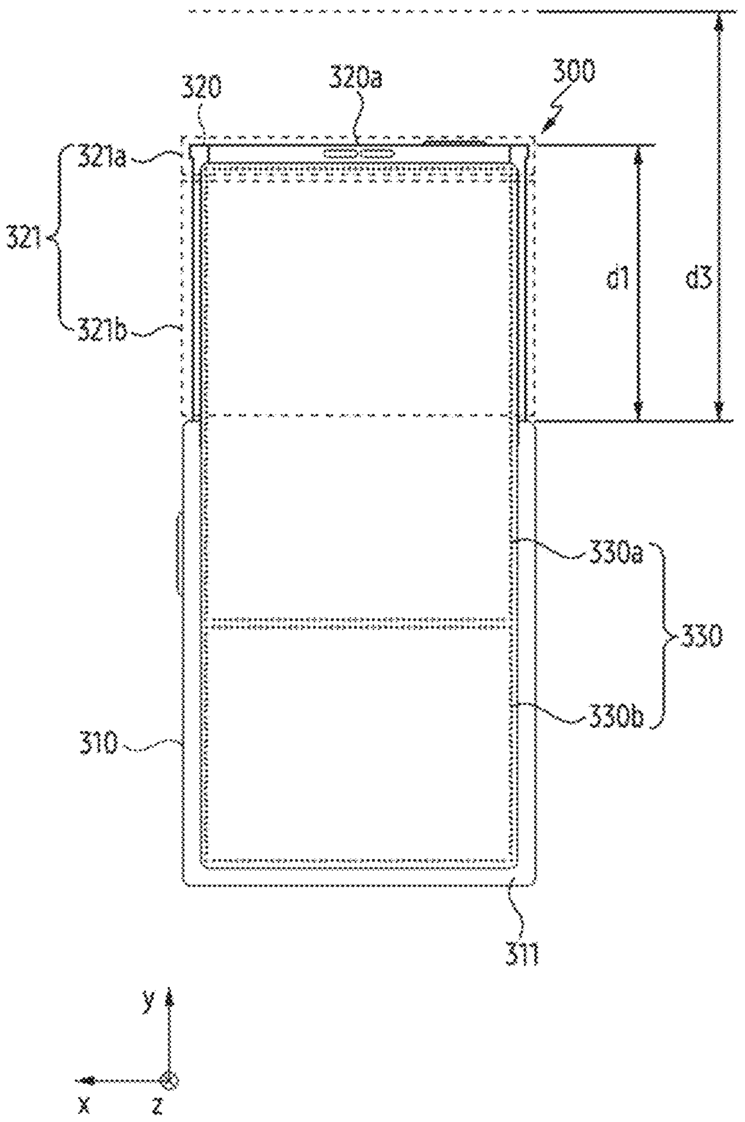
FIG. 2C is a front view of a second state of an electronic device according to one or more embodiments of the disclosure.
Figure 2D:
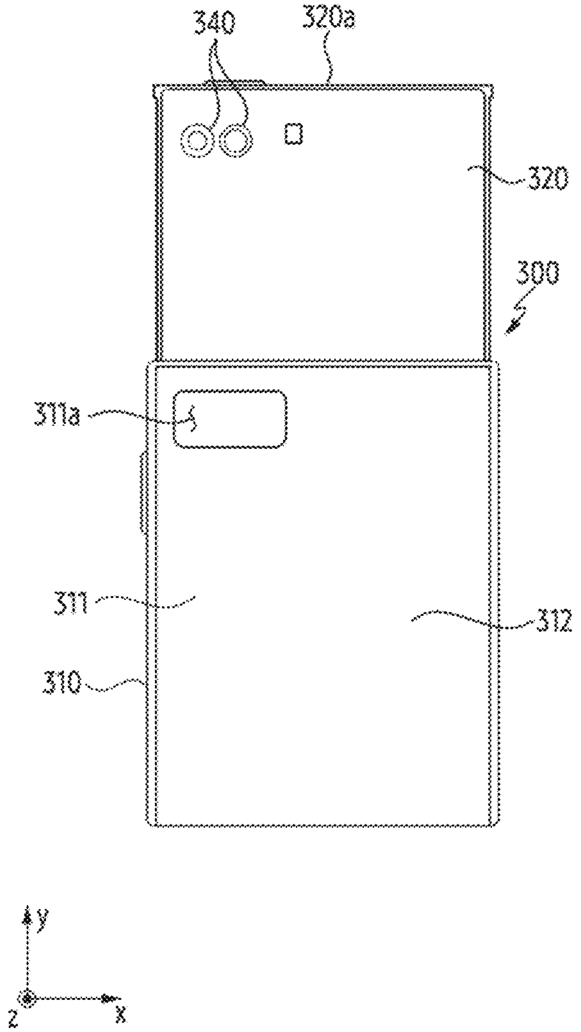
FIG. 2D is a rear view of a second state of an electronic device according to one or more embodiments of the disclosure.

FIG. 2A is a front view of a first state of an electronic device according to one or more embodiments, FIG. 2B is a rear view of a first state of an electronic device according to one or more embodiments, FIG. 2C is a front view of a second state of an electronic device according to one or more embodiments, and FIG. 2D is a rear view of a second state of an electronic device according to one or more embodiments.

Referring to FIGS. 2A, 2B, 2C, and 2D, an electronic device 300 (e.g., the electronic device 101 of FIG. 1) according to one or more embodiments may include a first housing 310, a second housing 320, a display 330 (e.g., the display module 160 of FIG. 1), and a camera 340 (e.g., the camera module 180 of FIG. 1). According to one or more embodiments, the second housing 320 may be slidable with respect to the first housing 310. For example, the second housing 320 may move within a specified distance with respect to the first housing 310 along a first direction (e.g., +y direction). When the second housing 320 moves along the first direction, a distance between a side surface 320*a* of the second housing 320 facing the first direction and the first housing 310 may increase. For another example, the second housing 320 may move within a specified distance with respect to the first housing 310 along a second direction (e.g., −y direction) opposite to the first direction. When the second housing 320 moves along the second direction, a distance between the side surface 320*a* of the second housing 320 facing the first direction and the first housing 310 may decrease. According to one or more embodiments, the second housing 320 may moves back and forth in a straight line with respect to the first housing 310 by sliding relatively with respect to the first housing 310. For example, at least a portion of the second housing 320 may be insertable into the first housing 310 or extractable from the first housing 310.

According to one or more embodiments, as the second housing 320 is designed to be slidable with respect to the first housing 310, the electronic device 300 may be named as a "slidable electronic device". According to one or more embodiments, as at least a portion of the display 330 is designed to be rolled inside the second housing 320 (or the first housing 310) based on sliding movement of the second housing 320, the electronic device 300 may be named as a "rollable electronic device".

According to one or more embodiments, the first state of the electronic device 300 may be defined as a state in which the second housing 320 moves in the second direction (e.g., a contracted state or a slide-in state). For example, in the first state of the electronic device 300, the second housing 320 may be movable in the first direction, but may not be movable in the second direction. In the first state of the electronic device 300, a distance between the side surface 320*a* of the second housing 320 and the first housing 310 may increase according to movement of the second housing 320, but may not decrease. For another example, in the first state of the electronic device 300, a portion of the second housing 320 may be extractable into the first housing 310, but may not be insertable. According to one or more embodiments, the first state of the electronic device 300 may be defined as a state in which a second region 330*b* of the display 330 is not visually exposed outside the electronic device 300. For example, in the first state of the electronic device 300, the second region 330*b* of the display 330 may be located inside an inner space of the electronic device 300, which is formed by the first housing 310 and/or the second housing 320, thereby not being visible from the outside of the electronic device 300.

According to one or more embodiments, the second state of the electronic device 300 may be defined as a state in which the second housing 320 moves in the first direction (e.g., an extended state or a slide-out state). For example, in the second state of the electronic device 300, the second housing 320 may be movable in the second direction, but may not be movable in the first direction. In the second state of the electronic device 300, a distance between the side surface 320*a* of the second housing 320 and the first housing 310 may decrease according to movement of the second housing 320, but may not increase. For another example, in the second state of the electronic device 300, a portion of the second housing 320 may be insertable into the first housing 310, but may not be extractable from the first housing 310. According to one or more embodiments, the second state of the electronic device 300 may be defined as a state in which the second region 330*b* of the display 330 is visually exposed outside the electronic device 300. For example, in the second state of the electronic device 300, the second region 330*b* of the display 330 may be extracted from the inner space of the electronic device 300, thereby being visible from the outside of the electronic device 300.

According to one or more embodiments, when the second housing 320 moves in the first direction from the first housing 310, at least a portion of the second housing 320 and/or the second region 330*b* of the display 330 may be extracted from the first housing 310 by an extraction length d1 corresponding to a moving distance of the second housing 320. According to one or more embodiments, the second housing 320 may reciprocate within a specified distance d2. According to one or more embodiments, the extraction length d1 may have a size of approximately 0 to the specified distance d2.

According to one or more embodiments, the state of the electronic device 300 may be convertible between the second state and/or the first state, by a manual operation by a user or an automatic operation by a driving module disposed inside the first housing 310 or the second housing 320. According to one or more embodiments, an operation of the driving module may be triggered based on a user input. According to one or more embodiments, the user input for triggering the operation of the driving module may include a touch input, a force touch input, and/or a gesture input through the display 330. According to another embodiment, the user input for triggering the operation of the driving module may include an audio input (voice input) or an input of a physical button exposed to the outside of the first housing 310 or the second housing 320. According to one or more embodiments, the driving module may operate in a semi-automatic manner whereby an operation is triggered when a manual operation by an external force of a user is detected.

According to one or more embodiments, the first state of the electronic device 300 may be referred to as a first shape, and the second state of the electronic device 300 may be referred to as a second shape. For example, the first shape may include a normal state, a reduced state, or a closed state, and the second shape may include an open state. According to one or more embodiments, the electronic device 300 may form a third state (e.g., an intermediate state) that is a state between the first state and the second state. For example, the third state may be referred to as a third shape, and the third shape may include a free-stop state.

According to one or more embodiments, the display 330 may be visible (or viewable) from the outside through a front direction (e.g., −z direction) of the electronic device 300 to display visual information to a user. For example, the display 330 may include a flexible display. According to one or more embodiments, the display 330 may be disposed in the second housing 320 and may be extracted from an inner space of the electronic device 300 or may be inserted into the inner space of the electronic device 300 according to the movement of the second housing 320. The inner space of the electronic device 300 may mean a space within the first housing 310 and the second housing 320 formed by a combination of the first housing 310 and the second housing 320. For example, in the first state of the electronic device 300, at least a portion of the display 330 may be rolled into the inner space of the electronic device 300, thereby being inserted. In a state of at least a portion of the display 330 being inserted into the inner space of the electronic device 300, when the second housing 320 moves in the first direction, at least a portion of the display 330 may be extracted from the inner space of the electronic device 300. For another example, when the second housing 320 moves in the second direction, at least a portion of the display 330 may be inserted into the inner space of the electronic device 300 by being rolled into the electronic device 300. As at least a portion of the display 330 is extracted or inserted, an area of the display 330 visible from the outside of the electronic device 300 may be expanded or reduced. According to one or more embodiments, the display 330 may include a first region 330*a* and the second region 330*b*.

According to one or more embodiments, the first region 330*a* of the display 330 may mean a region of the display 330 that may be fixedly visible from the outside of the electronic device 300, regardless of whether the electronic device 300 is in the second state or the first state. For example, the first region 330*a* may mean a partial region of the display 330 that is not rolled into the inner space of the electronic device 300. According to one or more embodiments, the first region 330*a* may move together with the second housing 320 when the second housing 320 moves. For example, the first region 330*a* may move along the first direction or the second direction on a front surface of the electronic device 300 together with the second housing 320, when the second housing 320 moves along the first direction or the second direction.

According to one or more embodiments, the second region 330*b* of the display 330 may be connected to the first region 330*a* and, may be inserted into the inner space of the electronic device 300 or may be extracted to the outside from the inner space of the electronic device 300, according to the movement of the second housing 320. For example, in the first state of the electronic device 300, the second region 330*b* of the display 330 may be in a state of being inserted into the inner space of the electronic device 300 in a rolled state. The second region 330*b* of the display 330 may be inserted into the inner space of the electronic device 300 in the first state of the electronic device 300 and may not be visible from the outside. For another example, the second region 330*b* of the display 330 may be in a state of being extracted from the inner space of the electronic device 300, in the second state of the electronic device 300. In the second state, the second region 330*b* of the display 330 may be visible from the outside of the electronic device 300.

According to one or more embodiments, in the first state of the electronic device 300, an area of the display 330 visible from the outside of the electronic device 300 may include only the first region 330*a* of the display 330. In the second state of the electronic device 300, an area of the display 330 visible from the outside of the electronic device 300 may include at least a portion of the first region 330*a* and the second region 330*b* of the display 330.

According to one or more embodiments, the first housing 310 of the electronic device 300 may include a book cover 311 surrounding the inner space of the first housing 310 and a rear plate 312 covering a rear surface of the book cover 311. The second housing 320 of the electronic device 300 may include a front cover 321 covering the inner space of the electronic device 300.

According to one or more embodiments, the front cover 321 may include a first cover region 321*a* of the front cover 321 that is not inserted into the first housing 310 and a second cover region 321*b* that is inserted into or extracted from the first housing 310. The first cover region 321*a* of the front cover 321 may be always visible regardless of whether the electronic device 300 is in the second state and the first state. According to one or more embodiments, at least a portion of the first cover region 321*a* of the front cover 321 may form a side surface 320*a* of the second housing 320. According to one or more embodiments, the second cover region 321*b* of the second housing 320 may not be visible in the first state, but may be visible in the second state.

The camera 340 may obtain an image of a subject based on receiving light from the outside of the electronic device 300. According to one or more embodiments, the camera 340 may include one or more lenses, an image sensor, and/or an image signal processor. According to one or more embodiments, the camera 340 may be disposed in the second housing 320 to face a rear surface of the electronic device 300 opposite to a front surface of the electronic device 300 in which the first region 330*a* of the display 330 is disposed. For example, the camera 340 may be disposed in the front cover 321 of the second housing 320, and may be visible from the outside of the electronic device 300 through the opening 311*a* formed in the book cover 311 when the electronic device 300 is in the first state. For another example, the camera 340 may be disposed in the front cover 321 of the second housing 320, and may not be visible from the outside of the electronic device 300 by being obscured by the book cover 311 and/or the rear plate 312, when the electronic device 300 is in the first state.

According to one or more embodiments, the camera 340 may include a plurality of cameras. For example, the camera 340 may include a wide-angle camera, an ultra-wide-angle camera, a telephoto camera, a proximity camera, and/or a depth camera. However, the camera 340 is not necessarily limited to including the plurality of cameras, and may include a camera.

According to one or more embodiments, the camera 340 may further include a camera facing the front of the electronic device 300 in which the first region 330*a* of the display 330 is disposed. When the camera 340 faces the front of the electronic device 300, the camera 340 may be an under display camera (UDC) disposed below the display 330 (e.g., in the +z direction from the display 330), but is not limited thereto.

According to one or more embodiments, the electronic device 300 may include a sensor module and/or a camera module disposed below the display 330. The sensor module may detect an external environment based on information (e.g., light) received by penetrating the display 330. According to one or more embodiments, the sensor module may include at least one of a receiver, a proximity sensor, an ultrasonic sensor, a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, a motor encoder, or an indicator. According to one or more embodiments, at least a portion of the sensor module of the electronic device 300 may be visually exposed from the outside through a partial region of the display 330. According to one or more embodiments, the electronic device 300 may detect a extraction length (e.g., length d1) using a sensor module. According to one or more embodiments, the electronic device 300 may generate extraction information related to a degree of extraction detected by the sensor. For example, the electronic device 300 may detect and/or verify the degree of extraction of the second housing 320 using the extraction information. According to one or more embodiments, the extraction information may include information regarding an extraction length of the second housing 320.

According to one or more embodiments, a coupling form of the first housing 310 and the second housing 320 is not limited to a form and a coupling illustrated in FIGS. 2A, 2B, 2C, 2D, 3A, and 3B, and may also be implemented by a combination and/or a coupling of another shape or component.

For example, FIGS. 2A to 2D illustrate the electronic device 300 in which a height of the display region is changed and a width of the display region is maintained when the first state (or the second state) is changed to the second state (or the first state) within a portrait mode, but this is for convenience of explanation. For example, the electronic device 300 may be implemented as maintaining the height of the display region and changing the width of the display region, when the first state (or the second state) is changed to the second state (or the first state) within the portrait mode.

Figure 3A:
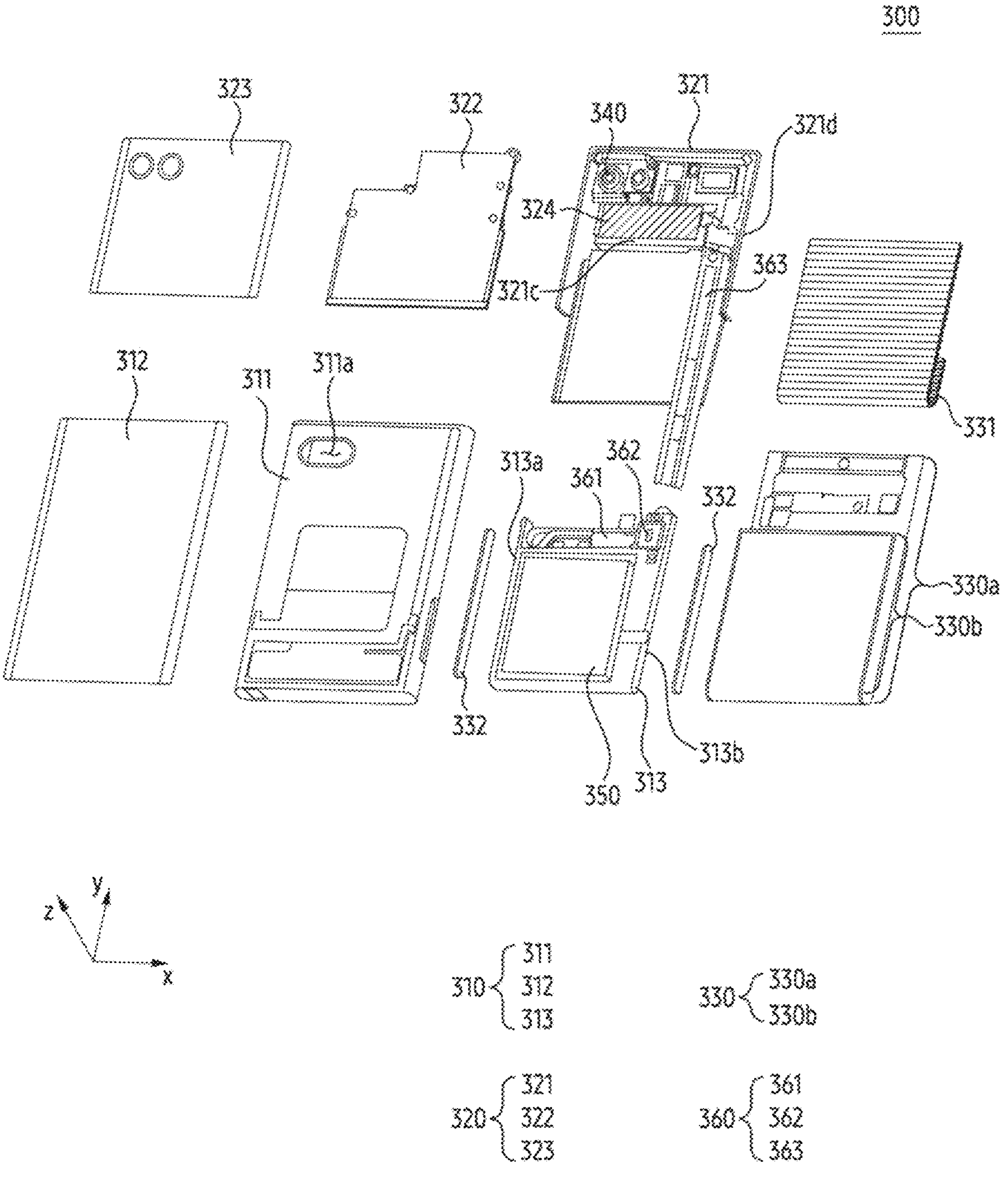
FIG. 3A is an exploded perspective view of an electronic device according to one or more embodiments of the disclosure.
Figure 3B:
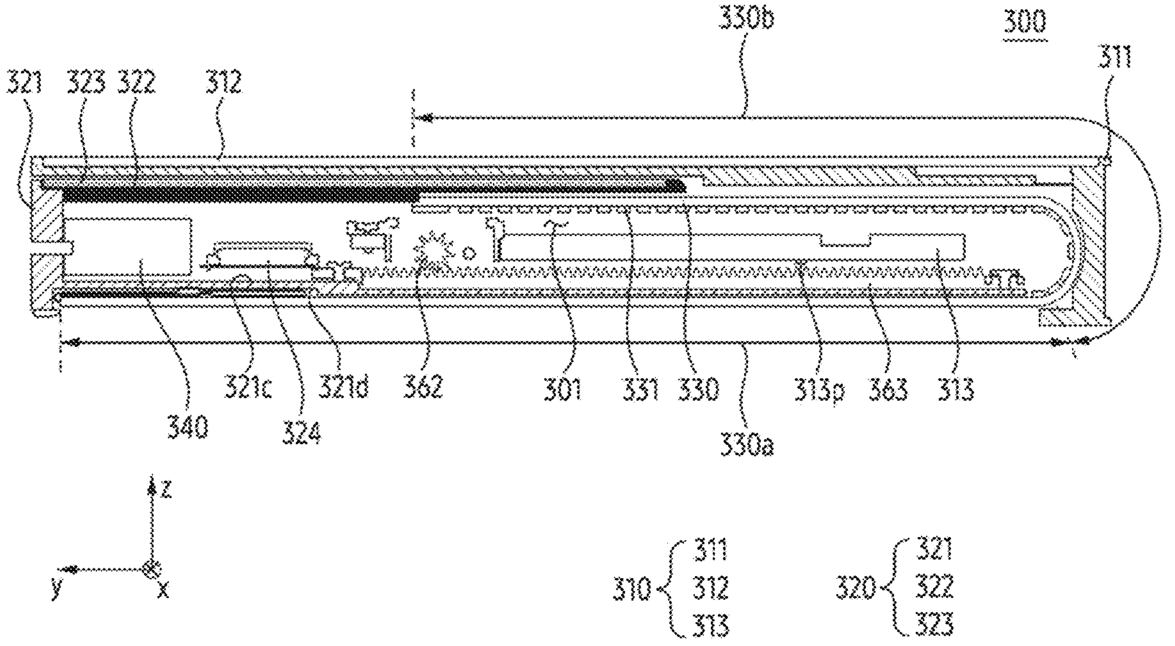
FIG. 3B is a cross-sectional view illustrating an example of an electronic device cut along line A-A' of FIG. 2A, according to one or more embodiments of the disclosure.

FIG. 3A is an exploded perspective view of an electronic device according to one or more embodiments, and FIG. 3B is a cross-sectional view illustrating an example of an electronic device cut along line A-A' of FIG. 2A, according to one or more embodiments.

Referring to FIGS. 3A and 3B, an electronic device 300 according to one or more embodiments may include a first housing 310, a second housing 320, a display 330, a camera 340, a battery 350 (e.g., the battery 189 of FIG. 1), and a driving unit 360. According to one or more embodiments, the first housing 310 and the second housing 320 may form an inner space 301 of the electronic device 300 by being coupled to each other. For example, in a first state of the electronic device 300, a second region 330*b* of the display 330 may be accommodated in the inner space 301.

According to one or more embodiments, the first housing 310 may include a book cover 311, a rear plate 312, and a frame cover 313. According to one or more embodiments, the book cover 311, the rear plate 312, and the frame cover 313 included in the first housing 310 may be combined with each other, and may not move when the second housing 320 moves with respect to the first housing 310. According to one or more embodiments, the book cover 311 may form at least a portion of an outer surface of the electronic device 300. For example, the book cover 311 may form at least a portion of a side surface of the electronic device 300 and may form at least a portion of a rear surface of the electronic device 300. According to one or more embodiments, the book cover 311 may provide a surface on which the rear plate 312 is seated. The rear plate 312 may be seated on a surface of the book cover 311.

According to one or more embodiments, the frame cover 313 may support inner components of the electronic device 300. For example, the frame cover 313 may accommodate at least a portion of the battery 350 and the driving unit 360. The battery 350 and the driving unit 360 may be accommodated in at least one of a recess or a hole included in the frame cover 313. According to one or more embodiments, the frame cover 313 may be surrounded by the book cover 311. For example, in the first state of the electronic device 300, the surface 313*a* of the frame cover 313 on which the battery 350 is disposed may face the book cover 311 and/or the second region 330*b* of the display 330. For another example, in the first state of the electronic device 300, another surface 313*b* of the frame cover 313 facing the surface 313*a* of the frame cover 313 may face a first region 330*a* of the display 330 or a front cover 321. For example, the frame cover 313 may include aluminum as a material, but is not limited thereto.

According to one or more embodiments, the second housing 320 may include the front cover 321, a rear cover 322, and a slide cover 323. According to one or more embodiments, the front cover 321, the rear cover 322, and the slide cover 323 are coupled to each other, and may move together with the second housing 320 when the second housing 320 moves relative to the first housing 310. The front cover 321 may support inner components of the electronic device 300. For example, a printed circuit board 324 on which electronic components (e.g., the processor 120 of FIG. 1) of the electronic device 300 is disposed and/or camera 340 may be disposed on the surface 321*c* of the front cover 321 facing the inner space 301. When the electronic device 300 is in the first state, another surface 321*d* of the front cover 321 facing the surface 321*c* of the front cover 321 may face the first region 330*a* of the display 330. According to one or more embodiments, the rear cover 322 may protect components of the electronic device 300 disposed in the front cover 321 by being coupled to the front cover 321. For example, the rear cover 322 may cover a portion of the surface 321*c* of the front cover 321. According to one or more embodiments, the slide cover 323 may form an external surface of the electronic device 300 together with the rear plate 312 and the book cover 311, by being disposed on the rear cover 322 (e.g., +z direction). The slide cover 323 may protect the rear cover 322 and/or the front cover 321 by being coupled to a surface of the rear cover 322.

According to one or more embodiments, when the electronic device 300 is in the first state, the display 330 may be bent by being at least partially rolled into the inner space 301. According to one or more embodiments, the display 330 may be capable of covering at least a portion of the frame cover 313 and at least a portion of the front cover 321. For example, when the electronic device 300 is in the first state, the display 330 may cover the other side 321*d* of the front cover 321 and extend toward the inner space 301 by passing between the front cover 321 and the book cover 311. The display 330 may surround the frame cover 313 after passing between the front cover 321 and the book cover 311. The display 330 may cover the surface 313*a* of the frame cover 313 within the inner space 301. According to one or more embodiments, when the second housing 320 moves in a first direction, the second region 330*b* of the display 330 may be extracted from the inner space 301. For example, as the second housing 320 moves in the second direction, the display 330 may be extracted from the inner space 301 by passing between the front cover 321 and the book cover 311.

According to one or more embodiments, the electronic device 300 may include a support bar 331 supporting the display 330 and a guide rail 332. For example, the support bar 331 may include a plurality of bars coupled to each other, and may be manufactured in a shape corresponding to the shape of the second region 330*b* of the display 330. According to one or more embodiments, as the display 330 moves, the support bar 331 may move together with the display 330. According to one or more embodiments, in a first state which is a state in which the second region 330*b* of the display 330 is wound within the inner space 301, the support bar 331 may be wound within the inner space 301 together with the second region 330*b* of the display 330. As the second housing 320 moves in the first direction, the support bar 331 may move together with the second region 330*b* of the display 330. According to one or more embodiments, the guide rail 332 may guide a movement of the support bar 331. For example, as the display 330 moves, the support bar 331 may move along the guide rail 332 coupled to the frame cover 313. According to one or more embodiments, the guide rail 332 may be coupled to the frame cover 313. For example, the guide rails 332 may include a plurality of guide rails 332, which is spaced apart from each other and disposed at both edges of the frame cover 313 spaced apart from each other along a third direction (e.g., +x direction) perpendicular to the first direction. According to one or more embodiments, the driving unit 360 may provide a driving force to the second housing 320 so that the second housing 320 may move relative to the first housing 310. According to one or more embodiments, the driving unit 360 may include a motor 361, a pinion gear 362, and a rack gear 363. The motor 361 may receive power from the battery 350, and provide a driving power to the second housing 320. According to one or more embodiments, the motor 361 may be disposed in the first housing 310 and may not move when the second housing 320 moves with respect to the first housing 310. For example, the motor 361 may be disposed in a recess formed in the frame cover 313. According to one or more embodiments, the pinion gear 362 may be coupled to the motor 361 and may rotate by the driving force provided from the motor 361. According to one or more embodiments, the rack gear 363 may be engaged with the pinion gear 362 and may move according to rotation of the pinion gear 362. For example, the rack gear 363 may moves back and forth in a straight line in the first direction or the second direction according to the rotation of the pinion gear 362. According to one or more embodiments, the rack gear 363 may be disposed in the second housing 320. For example, the rack gear 363 may be coupled to the front cover 321 included in the second housing 320. According to one or more embodiments, the rack gear 363 may be movable inside an operating space 313*p* formed in the frame cover 313.

According to one or more embodiments, when the pinion gear 362 rotates along a first rotation direction (e.g., clockwise in FIG. 3B), the rack gear 363 may move in the first direction (e.g., +y direction). When the rack gear 363 moves along the first direction, the second housing 320 coupled to the rack gear 363 may move along the first direction. As the second housing 320 moves in the first direction, an area of the display 330 visible from the outside of the electronic device 300 may be expanded. When the pinion gear 362 rotates along a second rotation direction (e.g., counterclockwise in FIG. 3B), the rack gear 363 may move in the second direction (e.g., −y direction). When the rack gear 363 moves along the second direction, the second housing 320 coupled to the rack gear 363 may move along the second direction. As the second housing 320 moves along the second direction, the area of the display 330 visible from the outside of the electronic device 300 may be reduced.

In the above description, it was described that the motor 361 and the pinion gear 362 are disposed in the first housing 310, and the rack gear 363 is disposed in the second housing 320, but embodiments may not be limited thereto. According to embodiments, the motor 361 and the pinion gear 362 may be disposed in the second housing 320, and the rack gear 363 may be disposed in the first housing 310.

FIGS. 2A to 3B may illustrate the electronic devices 300 in which a height of the display region is changed and a width of the display region is maintained when the first state (or the second state) is changed to the second state (or the first state) in a portrait mode, but this is for convenience of explanation. For example, the electronic device 300 may be implemented as maintaining the height of the display region and changing the width of the display region, when the first state (or the second state) is changed to the second state (or the first state) in the portrait mode.

Figure 4A:
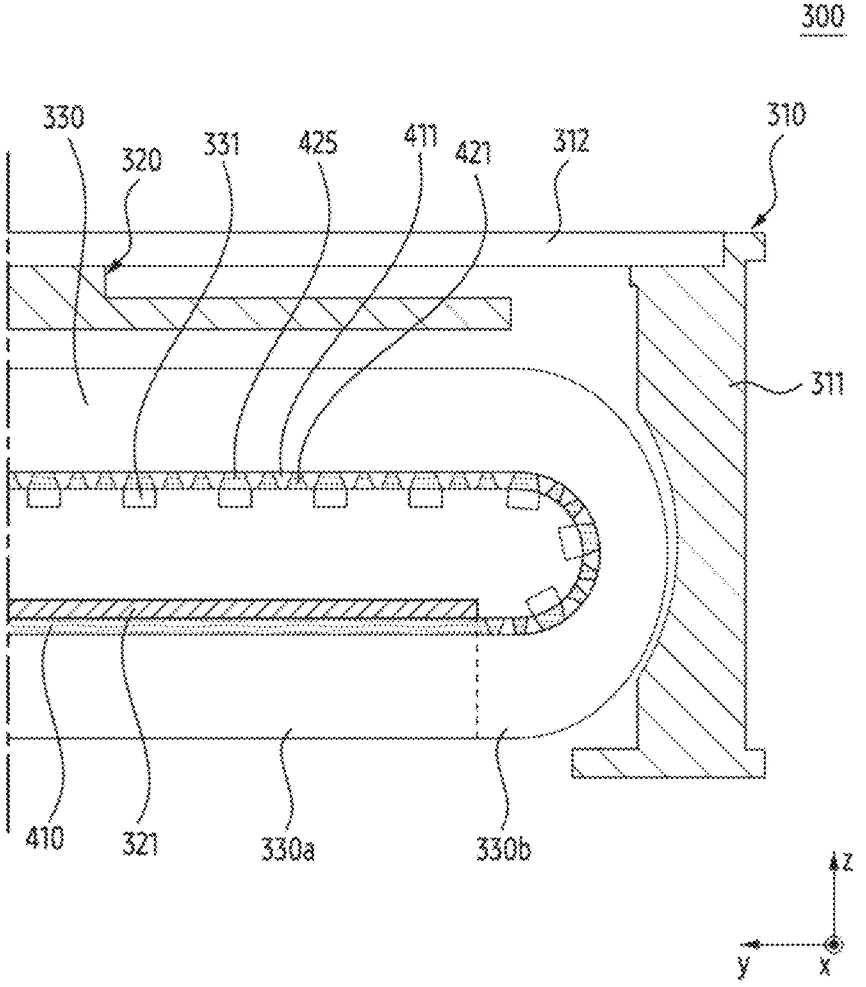
FIG. 4A illustrates a disposition of a support plate in a first state of an electronic device according to one or more embodiments of the disclosure.
Figure 4B:
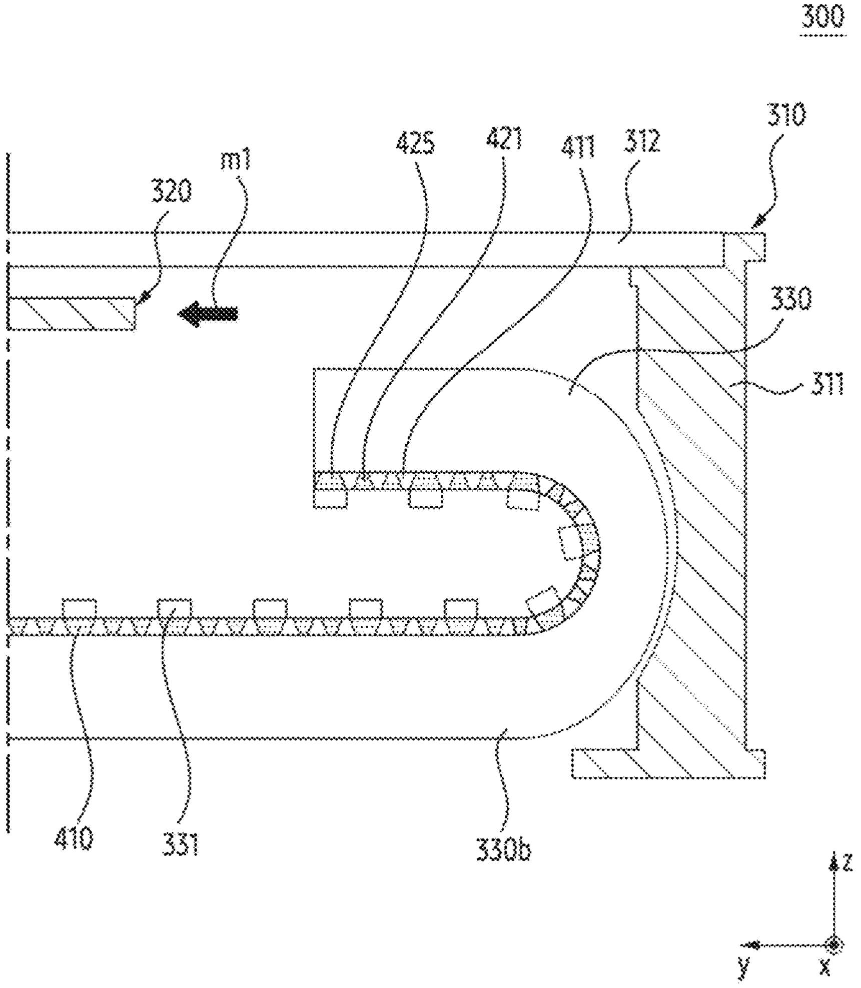
FIG. 4B illustrates a disposition of a support plate in a second state of an electronic device according to one or more embodiments of the disclosure.
Figure 5:
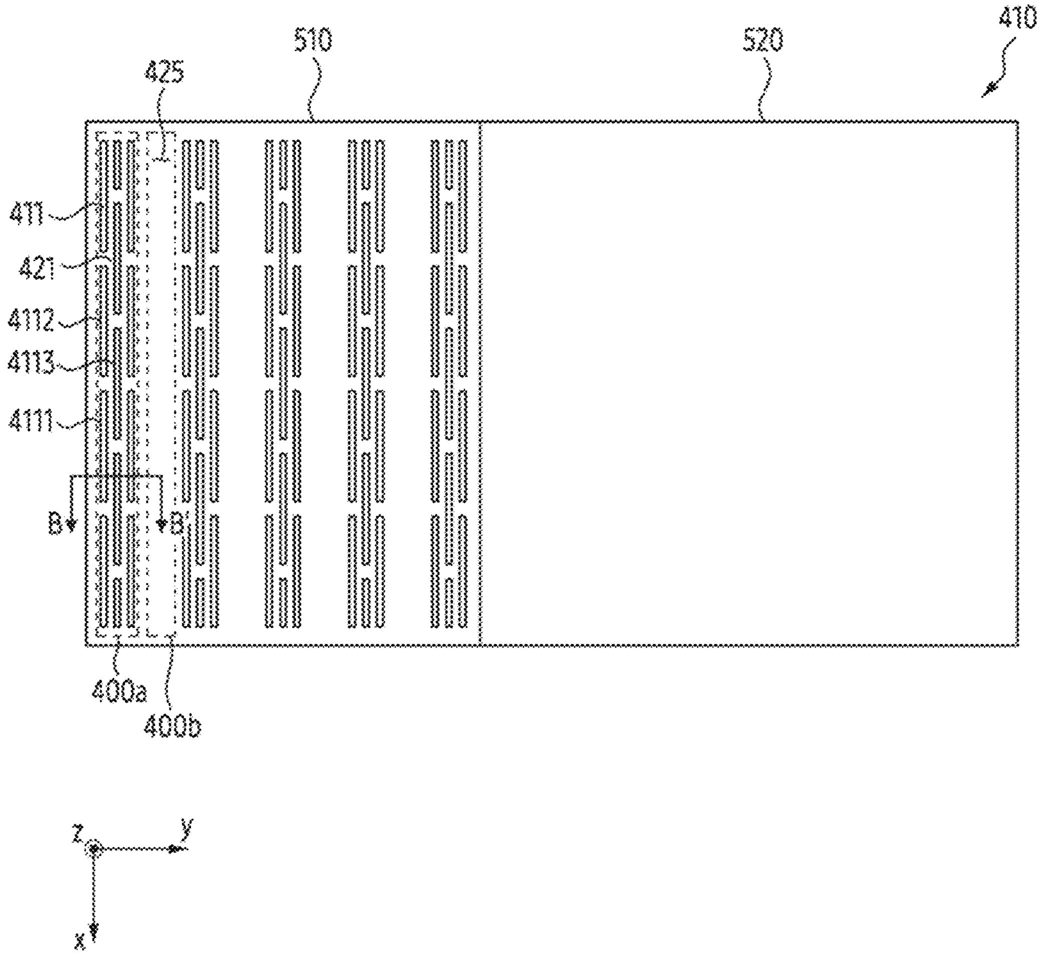
FIG. 5 is a plan view of a support plate according to one or more embodiments of the disclosure.

FIG. 4A illustrates a disposition of a support plate in a first state of an electronic device according to one or more embodiments. FIG. 4B illustrates a disposition of a support plate in a second state of an electronic device according to one or more embodiments. FIG. 5 is a plan view of a support plate according to one or more embodiments.

Referring to FIGS. 4A and 4B, an electronic device 300 may include a first housing 310, a second housing 320, and a display 330. The first housing 310 may include a book cover 311 and a rear plate 312. The second housing 320 may include a front cover 321. The second housing 320 may be movably coupled to the first housing 310 in a first direction (e.g., +y direction) or a second direction (e.g., −y direction).

The display 330 may be supported by a support plate 410, a front cover 321, and a support bar 331. The display 330 may include a first region 330*a* exposed to the outside of the electronic device 300 and disposed on the second housing 320, and a second region 330*b* that expands according to a movement of the second housing 320 in the first direction (e.g., +y direction) or contracts according to a movement of the second housing 320 in the second direction (e.g., −y direction).

The first region 330*a* may be disposed on the front cover 321, and the second region 330*b* may be disposed on the support bar 331. The support plate 410 may support the display 330. For example, the display 330 may be disposed on the support plate 410.

Referring to FIG. 5, the support plate 410 may be supported by the front cover 321 and the support bar 331. The front cover 321 may support the first region 330*a* of the display 330 and a lattice region 510 of the support plate 410 corresponding to the first region 330*a*. The support bar 331 may support the second region 330*b* of the display 330 and the lattice region 510 of the support plate 410 corresponding to the second region 330*b*.

The lattice region 510 and the support bar 331 of the support plate 410 may have a shape corresponding to a shape of the second region 330*b* of the display 330. For example, a shape of a surface of the support bar 331 facing the display 330 and a surface of the lattice region 510 of the support plate 410 may correspond to a shape of a surface of the display 330 facing the support bar 331. The shape of the second region 330*b* of the display 330 may change according to a state change of the electronic device 300.

The support plate 410 may be formed as a flat surface in a planar region 520 corresponding to the first region 330*a*. For example, the support plate 410 may include a continuous surface in the planar region 520.

The support plate 410 may include a plurality of slits 411 in the lattice region 510 corresponding to the second region 330*b*. The support plate 410 may include a flexible region 400*a* in the lattice region 510 corresponding to the second region 330*b* and a rigid region 400*b* in contact with the flexible region 400*a*. In the flexible region 400*a*, the support plate 410 may include the flexible region 400*a* and the rigid region 400*b*, which are alternately disposed. The support plate 410 may include the plurality of slits 411 disposed in the flexible region 400*a* among the flexible region 400*a* and the rigid region 400*b*. The support plate 410 may include bridges 421 disposed between the plurality of slits 411, in the flexible region 400*a*. The plurality of slits 411 may be spaced apart from each other in the flexible region 400*a*. For example, the plurality of slits 411 may include a first slit 4111 and other slits 4112 and 4113 spaced apart from the first slit 4111. The plurality of slits 411 may include a second slit 4112 spaced apart from the first slit 4111 in a third direction (e.g., −x direction) perpendicular to the first direction (e.g., +y direction). The plurality of slits 411 may include a third slit 4113 spaced apart from the first slit 4111 in the first direction (e.g., +y direction). The support plate 410 may include a rigid portion 425 disposed in the rigid region 400*b* among the flexible region 400*a* and the rigid region 400*b*. The rigid portion 425 may contact a portion of the plurality of slits 411.

The support plate 410 may provide flexibility by the plurality of slits 411, in the lattice region 510. When the support plate 410 is bent, a gap between the plurality of slits 411 may be reduced. For example, the support plate 410 may include the plurality of slits 411 in which the gap is reduced in a region of the support plate 410 facing the book cover 311 of the first housing 310.

In the first state of FIG. 4A, a portion close to the lattice region 510 of the support plate 410 may face the book cover 311, and the portion may be bent. A gap between the plurality of slits 411 included in the portion may be reduced. In the second state of FIG. 4B, a gap between the plurality of slits 411 included in a portion close to a side surface of the support plate 410 that is far from the first region 330*a* or the planar region 520 of the support plate 410 may be reduced. In the lattice region 510 of the support plate 410, a portion facing the book cover 311 may be changed, according to a change in a state of the electronic device 300. A gap between slits of a portion of the support plate 410 facing the book cover 311 may be narrowed and the gap between the plurality of slits may be widened when moving away from the book cover 311 in the first direction (e.g., +y direction). The support plate 410 may secure flexibility in the lattice region 510 due to a change of the gap between the plurality of slits. A first width of each of the plurality of slits 411 facing the display 330 may be wider than a second width of each of the plurality of slits 411 facing the inside of the electronic device 300. A first width of each of a plurality of bridges 421 facing the display 330 may be narrower than a second width of each of the plurality of bridges 421 facing the inside of the electronic device 300. A first width of each of a plurality of rigid portions 425 facing the display 330 may be narrower than a second width of each of the plurality of rigid portions 425 facing the inside of the electronic device 300. A surface of the bridges 421 facing the display 330 and a surface of the rigid portion 425 may provide a support force to prevent deformation of the display 330. Another surface of the bridges 421 facing an inner space and another surface of the rigid portion 425 may provide a disposition space for the support bar 331, in order to prevent deformation due to a repulsive force generated when the support plate 410 is bent. For a disposition of the support bar 331, a width of the rigid portion 425 may be equal to or greater than a width of the support bar 331.

The support plate 410 may be integrally formed with the support bar 331. For example, the support bar 331 may be fastened to the support plate 410. The support bar 331 and the support plate 410 may be physically fastened. For example, the support bar 331 may be fastened by being inserted into a groove formed by mechanical processing or an etching on the rigid portion 425 of the support plate 410. For example, a protrusion formed at an end of the support bar 331 may be inserted into the groove to be fastened. In order to increase adhesion force, an inner surface of the groove may have a roughness. For example, an adhesive member may be disposed between the inner surface of the groove and the protrusion of the support bar 331. Through the roughness of the inner surface of the groove, a contact surface between the groove and the support bar 331 increases, and thus an adhesive force may increase between the support bar 331 and the support plate 410. According to one or more embodiments, the support plate 410 and the support bar 331 may be fastened through a screw coupling, a force fitting, or a hook coupling. The support plate 410 and the support bar 331 may be coupled through bonding (e.g., welding).

According to one or more embodiments, the support plate 410 and the support bar 331 may be formed in a single structure. A structure object including the support plate 410 and the support bar 331 may be formed from a single base material through cutting processing, machine processing, or an etching. For example, the base material may be manufactured as a structure object having the support plate 410 and the support bar 331 protruding from the support plate 410, by being cut or mechanically processed.

According to the above-described embodiment, the support plate 410 may include the plurality of slits 411 having different widths, in order to minimize a repulsive force while having flexibility. A width of each of the plurality of slits 411 of a surface facing the display 330 may be wider than a width of each of the plurality of slits 411 of a surface facing the inside of the electronic device 300. A width of the plurality of slits 411 of the surface facing the display 330 may correspond to a specified width or may be formed to be greater than or equal to the specified width, in order to provide flexibility. A width of the plurality of slits 411 of the surface facing the inside of the electronic device 300 may be determined to prevent deformation of the support plate 410 due to a repulsive force caused by bending of the support plate 410. For example, the width of the plurality of slits 411 of the surface facing the inside of the electronic device 300 may be determined by a width of the support bars 331 supporting the support plate 410. In order to prevent deformation of the support plate 410 from a repulsive force, the electronic device 300 including the rigid portion 425 disposed between the plurality of slits 411 may provide a support bar 331 having a width greater than or equal to a specified width.

Figure 6:
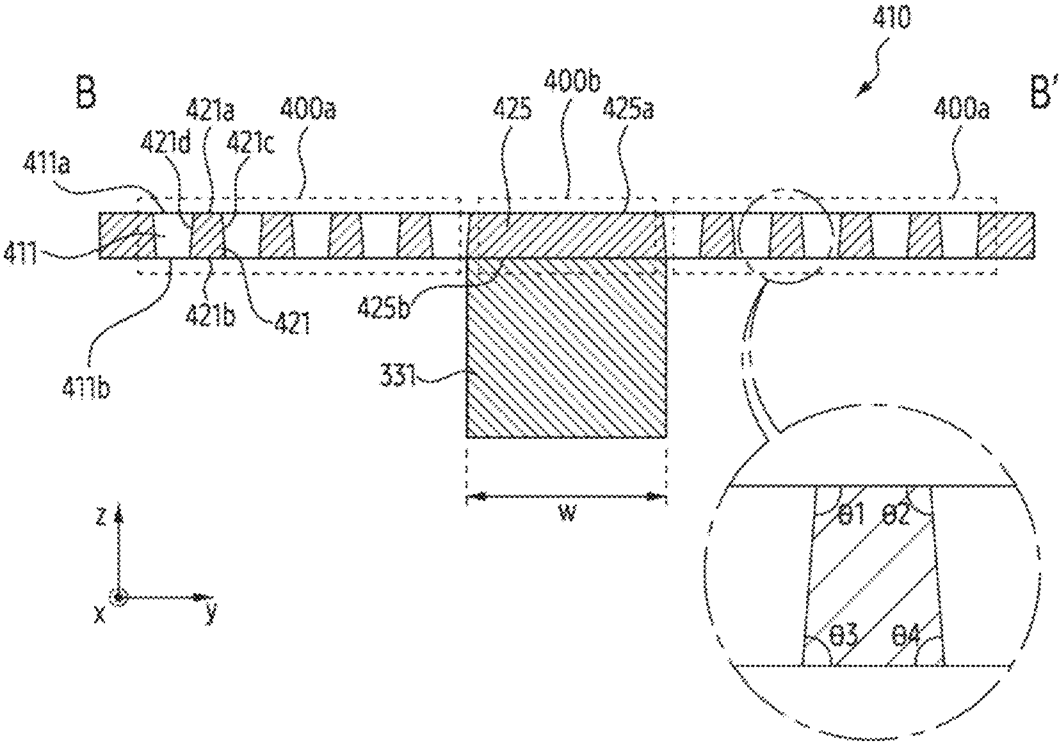
FIG. 6 is a cross-sectional view of a support plate of FIG. 5 cut along line B-B', according to one or more embodiments of the disclosure.
Figure 7:
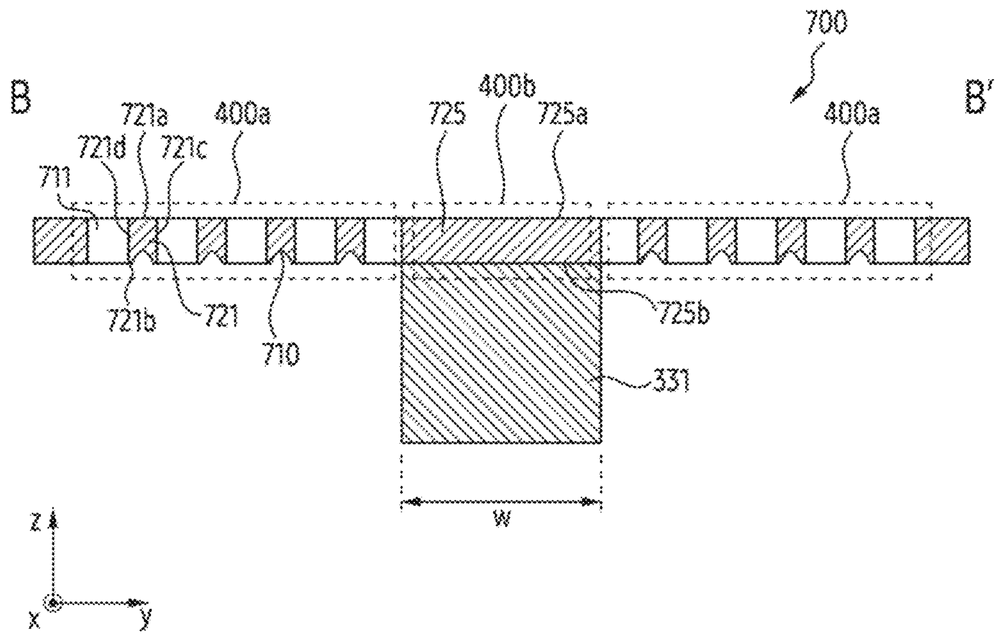
FIG. 7 is a cross-sectional view of a support plate that includes bridges having a groove.
Figure 8:
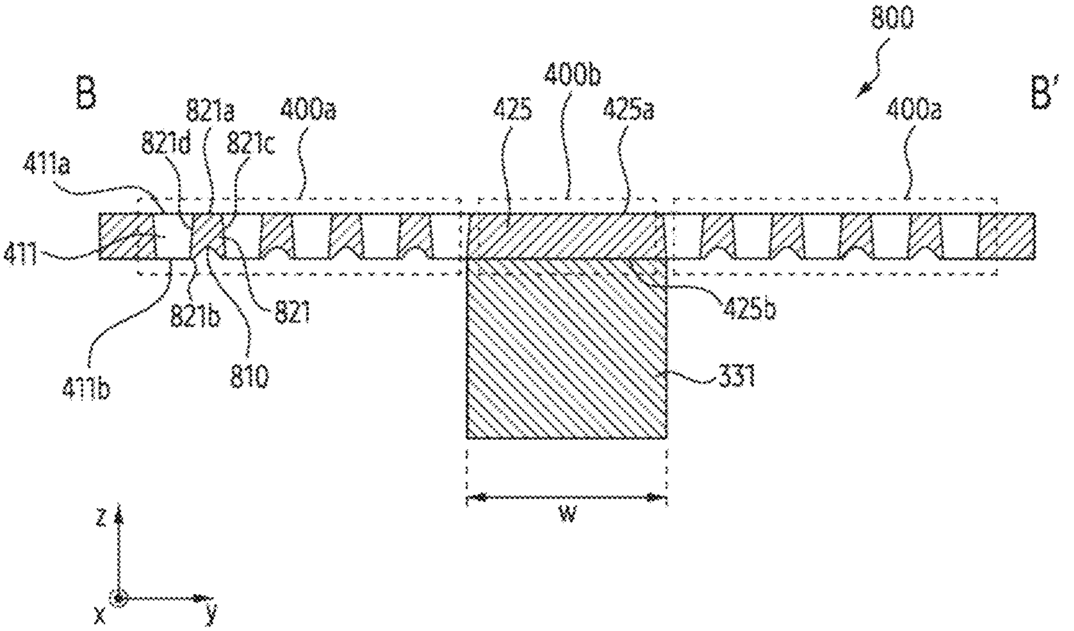
FIG. 8 is a cross-sectional view of a support plate that includes bridges having a groove and an inclined side.

FIG. 6 is a cross-sectional view of a support plate of FIG. 5 cut along line B-B' according to one or more embodiments. FIG. 7 is a cross-sectional view of a support plate that includes bridges having a groove. FIG. 8 is a cross-sectional view of a support plate that includes bridges having a groove and an inclined side surface.

Referring to FIG. 6, a support plate 410 may include a flexible region 400*a* and a rigid region 400*b* within a lattice region 510 (e.g., the lattice region 510 of FIG. 5). The support plate 410 may include a polymer material, a reinforced plastic, or a metal material. For example, the support plate 410 may include at least one of a carbon fiber reinforced polymer (CFRP), a glass fiber reinforced plastics (GFRP), and a stainless steel.

The flexible region 400*a* may be configured to be bendable according to deformation of a display (e.g., the display 330 of FIG. 2A). For example, the lattice region 510 of the support plate 410 may be deformed according to deformation of the display 330. A point of the display 330 that is bend based on a state change of an electronic device (e.g., the electronic device 300 of FIG. 2A) may be changed. A point of the support plate 410 corresponding to the bending point of the display 330 may be bent. The point of the support plate 410 may be disposed in the flexible region 400*a*. In order to be bend at the point of the support plate 410, the support plate 410 may include a plurality of slits 411 and bridges 421 disposed between the plurality of slits 411 in the flexible region 400*a*.

The plurality of slits 411 may provide flexibility to the flexible region 400*a* of the support plate 410. The plurality of slits 411 may have a width for providing flexibility in the flexible region 400*a*, according to deformation of the second region 330*b* (e.g., the second region 330*b* of FIG. 2C) of the display 330 (e.g., the display 330 of FIG. 3A). For example, an area of a surface of slits 411 facing the display 330 may be formed relatively wide to have a width for providing flexibility. An area of another surface of the slits 411 facing the inside of the electronic device 300 may be formed narrower than the area of the surface of the slits 411, in order to increase robustness against a repulsive force. Through a shape of the slits 411, a shape of the bridges 421 may be determined.

The bridges 421 may extend in a third direction (−x direction) perpendicular to a first direction (e.g., +y direction) and parallel to a surface of the support plate 410. Each of the bridges 421 may have a trapezoidal shape. For example, a width of a surface of the bridges 421 in a direction (e.g., the +z direction) facing a display (e.g., the display 330 of FIG. 4A) may be narrower than a width of another surface of the bridge in a direction (e.g., the −z direction) facing the inside of the electronic device. Each of the bridges 421 may include a first surface 421*a*, a second surface 421*b*, a first sidewall 421*c*, and a second sidewall 421*d*. Each of the bridges 421 may be connected to each other at an end of the slits 411. The first surface 421*a* may be a surface facing the display 330 of each of the bridges 421. The second surface 421*b* may be a surface facing the inside of the electronic device 300 of each of the bridges 421. For example, the second surface 421*b* may face a direction opposite to the direction in which the first surface 421*a* faces. An area of the first surface 421*a* having a relatively narrow width may be narrower than an area of the second surface 421*b*. The first sidewall 421*c* may connect the first surface 421*a* and the second surface 421*b*, and may form a portion of a side surface of the bridges 421. The second sidewall 421*d* may connect the first surface 421*a* and the second surface 421*b*, and may form a remaining portion of the side surface of the bridges 421. The first sidewall 421*c* and the second sidewall 421*d* forming the side surface of the bridge may be connected to a sidewall of another bridge at an end of the slits 411.

The first sidewall 421*c* may extend in the third direction (e.g., −x direction) parallel to a surface of the support plate 410 and perpendicular to the first direction. The first sidewall 421*c* may have a first inclination with respect to a surface of the support plate 410. The second sidewall 421*d* may face the first sidewall. The first sidewall 421*c* may have a slope with respect to the first surface 421*a*. For example, an angle Θ2 between the first surface 421*a* and the first sidewall 421*c* may be an obtuse angle. The first sidewall 421*c* may have a slope with respect to the second surface 421*b*. For example, an angle Θ4 between the second surface 421*b* and the first sidewalls 421*c* may be an acute angle.

The second sidewall 421*d* may have a second inclination with respect to a surface of the support plate 410. The second sidewall 421*d* may have a slope with respect to the first surface 421*a*. For example, an angle Θ1 between the first surface 421*a* and the second sidewall 421*d* may be an obtuse angle. The second sidewall 421*d* may have a slope with respect to the second surface 421*b*. For example, an angle Θ3 between the second surface 421*b* and the second sidewall 421*d* may be an acute angle.

The first inclination may be symmetrical with the second inclination based on an imaginary line extending in a longitudinal direction of each of the plurality of slits 411. For example, a size of the angle Θ2 between the first sidewall 421*c* and the first surface 421*a* may be the same as a size of the angle Θ1 between the second sidewall 421*d* and the first surface 421*a*. The size of the angle Θ2 between the first sidewall 421*c* and the first surface 421*a* may be represented as the same as the size of the angle Θ1 between the second sidewall 421*d* and the first surface 421*a*, but is not limited thereto, and may be different from each other.

The flexible region 400*a* may extend in a third direction (e.g., +x direction) perpendicular to the first direction (e.g., +y direction) and parallel to the surface of the support plate 410. The bridges 421 and the slits 411 in the flexible region 400*a* may be formed in a trapezoidal shape. The bridges 421 may be spaced apart from each other and may extend in the third direction perpendicular to the first direction and parallel to the support plate 410. The slits 411 formed in the flexible region 400*a* may extend in the third direction perpendicular to the first direction and parallel to the support plate 410. The bridges 421 and the slits 411 may be alternately disposed in the flexible region 400*a*. A rigid portion 425*b* within the rigid region 400*b* in contact with the flexible region 400*a* may be formed in a trapezoidal shape, based on a shape of the bridges 421 and the slits 411.

The rigid region 400*b* may extend in a third direction perpendicular to the first direction and parallel to the support plate 410. A width of a surface 425*a* of the rigid portion 425 facing the display 330 may be narrower than a width of another surface 425*b* of the rigid portion 425 facing the inside of the electronic device (e.g., the electronic device 300 of FIG. 3A). An area of the surface 425*a* of the rigid portion 425 may be narrower than an area of the other surface 425*b* of the rigid portion 425.

The electronic device 300 may further include a support bar 331 disposed on the rigid region 400*b*. The support bar 331 may support the support plate 410. A width W of the support bar 331 may correspond to the width of the other surface 425*b* of the rigid portion 425 facing the inside of the electronic device 300. The width W of the support bar 331 may be wider than the width of the rigid portion 425 facing the display 330. Since another surface of the rigid portion 425 corresponds to a width of the support bar 331, the support bar 331 may support the rigid portion 425. The support bar 331 may reduce deformation of the support plate 410 caused by a repulsive force of the lattice region 510, by being configured to contact with the other surface 425*b* of the rigid portion 425.

Referring to FIG. 7, a support plate 700 may include a plurality of slits 711, a plurality of bridges 721, and a rigid portion 725. The plurality of slits 711 may be spaced apart from each other in the first direction. For example, a first slit among the plurality of slits 711 may be spaced apart from a second slit in the first direction.

The bridges 721 may be disposed between the plurality of slits 711 in the flexible region 400*a*. Each of the bridges 721 may include a first surface 721*a* facing the display 330 and a second surface 721*b* facing the inside of the electronic device 300. A first sidewall 721*c* and a second sidewall 721*d*, which are disposed between the first surface 721*a* and the second surface 721*b*, may be included. The first sidewall 721*c* may be substantially perpendicular to the first surface 721*a* or the second surface 721*b*. The second sidewall 721*d* may be substantially perpendicular to the first surface 721*a* or the second surface 721*b*. A width of the first surface 721*a* may be substantially the same as a width of the second surface 721*b*.

Each of the bridges 721 may include a groove 710 disposed on a surface 721*b* facing the inside of the electronic device 300. The groove 710 may reduce a stress applied to the bridges 721 when a flexible region 400*a* is bent. Durability of the support plate 410 may be improved by a reduction of the stress applied to the bridges 721.

The bridges 721 may be disposed between the plurality of slits 711. The bridges 721 may be in contact with slits located at both sides of the bridges 721 among the plurality of slits 711. The bridges 721 may extend in the third direction perpendicular to the first direction and parallel to the surface of the support plate 410. The groove 710 may extend in the third direction perpendicular to the first direction and parallel to the surface of the support plate. The groove 710 may extend in a longitudinal direction of each of the bridges 721.

The rigid portion 725 may be a portion supported by the support bar 331. A shape of a first surface 725*a* and a second surface 725*b* of a rigid portion may be determined by a shape of a bridge 721 and a slit 711.

Referring to FIG. 8, a support plate 800 may include bridges 821*a* in which the bridges 421 of FIG. 6 are modified. Each of the bridges 821*a* may include a first surface 821*a*, a second surface 821*b*, a first sidewall 821*c*, and a second sidewall 821*d*. A surface of the bridges 821 may be similar to the surface of the bridges 421 of FIG. 6. A shape of the bridges 821 may be determined by a shape of the slits 411. The bridges 821 may be formed in a trapezoidal shape. The second surface 821*b* of the bridges 821 may further include a groove 810. The groove 810 may reduce a stress applied to the bridges 821 when the flexible region 400*a* is bent. Durability of the support plate 410 may be improved by a reduction of a stress applied to the bridges 821.

According to the above-described embodiment, a support plate 700 and 800 may include the groove 710. The support plates 700 and 800 may reduce a bending stress caused by deformation of the support plate 410 through the grooves 710. For example, a stress applied to the bridges 721 may be reduced by distributing a compressive force applied to the first surface 721*a* of the bridges 721 when the support plate 410 is bent.

The support plate 410 of FIG. 6 or the support plate 800 of FIG. 8 may provide a support bar 331 having a wide width W, by including the plurality of slits 411 and the bridges 821 in a trapezoidal shape. The support bar 331 having the wide width W may reduce deformation of the support plate 410 from a repulsive force caused by bending of the support plate 410. By having the groove 810, a stress applied to the bridges 821 may be reduced. A lifespan of the bridges 821 may be extended by the reduced stress. Damage to the bridges 821 may be reduced by the reduced stress.

Figure 9:
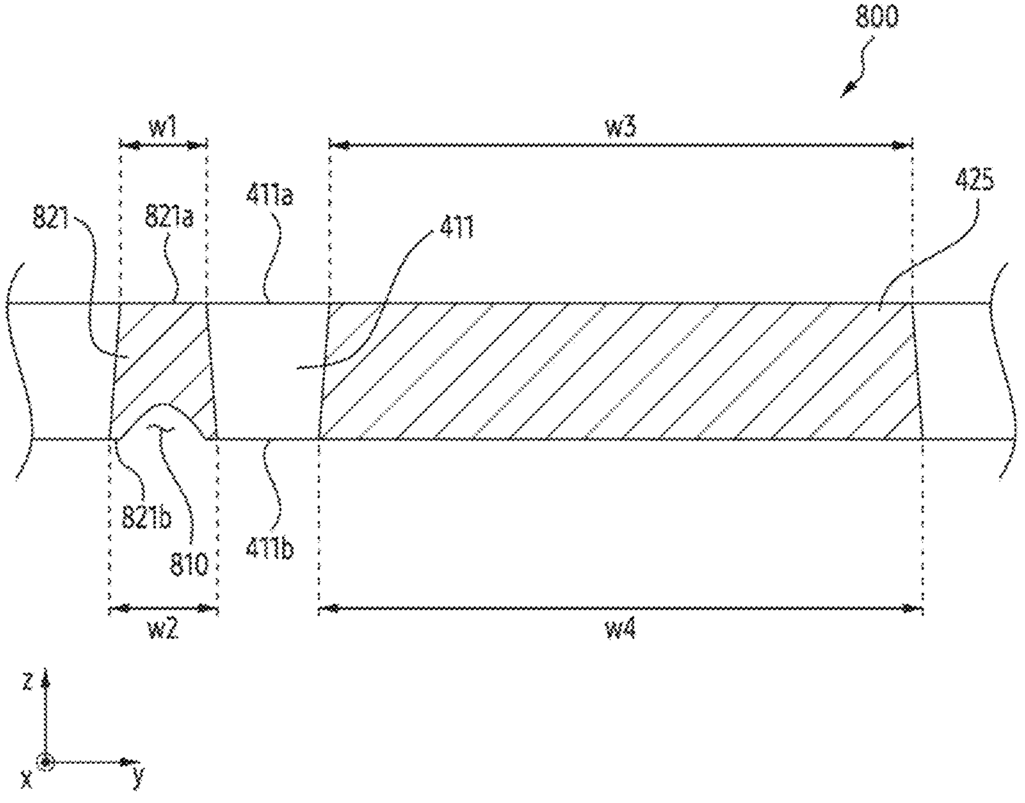
FIG. 9 is a diagram illustrating a support region of a support bar and a configuration of a bridge in detail.

FIG. 9 is a diagram illustrating a support region of a support bar and a configuration of a bridge in detail.

A support plate 800 may include bridges 821, a rigid portion 425, and a plurality of slits 411. The bridges 821 may include a first surface 821*a* facing a display 330 and a second surface 821*b* facing the inside of an electronic device 300. A width w1 of the first surface 821*a* may be different from a width w2 of the second surface 821*b*. The width w1 of the first surface 821*a* of the bridges 821 may be narrower than the width w2 of the second surface 821*b* of the bridges 821. An area of the first surface 821*a* may be narrower than an area of the second surface 821*b*. A width of the first surface 821*a* may be determined by a first width 411*a* of a slit among a plurality of slits 411 in contact with the first surface 821*a*. For example, when the first width 411*a* is widened, the width of the first surface 821*a* may be decreased. When the first width 411*a* is decreased, the width of the first surface 821*a* may be increased. The first width 411*a* may be configured to have a specified width or more to secure the flexibility of the display 330. A width of the second surface 821*b* may be determined by a second width 411*b* of a slit among the plurality of slits 411 in contact with the second surface 821*b*. For example, when the second width 411*b* is widened, the width of the second surface 821*b* may be decreased. When the second width 411*b* is decreased, the width of the second surface 821*b* may be increased. The second width 411*b* may be configured to have a specified width or more to secure the flexibility of the display 330.

Widths of facing surfaces of a rigid portion 425 may be different from each other. A width w3 of the rigid portion 425 facing the display 330 may be narrower than a width w4 of the rigid portion 425 facing the inside of the electronic device 300.

A width (e.g., the width W of FIG. 6) of a support bar (e.g., the support bar of FIG. 4A) disposed in the rigid portion 425 facing the inside of the electronic device 300 may correspond to the width w4 of the rigid portion 425 within the rigid region (e.g., the rigid region 400*b* of FIG. 5) facing the inside of the electronic device. The width W of the support bar 331 may be wider than the width of the rigid portion 425 within the rigid region 400*b* facing the display 330.

The support plate 410 may provide the support bar 331 having a wide width W by including the plurality of slits 411 and the bridges 821 in a trapezoidal shape. The support bar 331 having the wide width W may reduce deformation of the support plate 410 from a repulsive force caused by bending the support plate 410.

Figure 10:
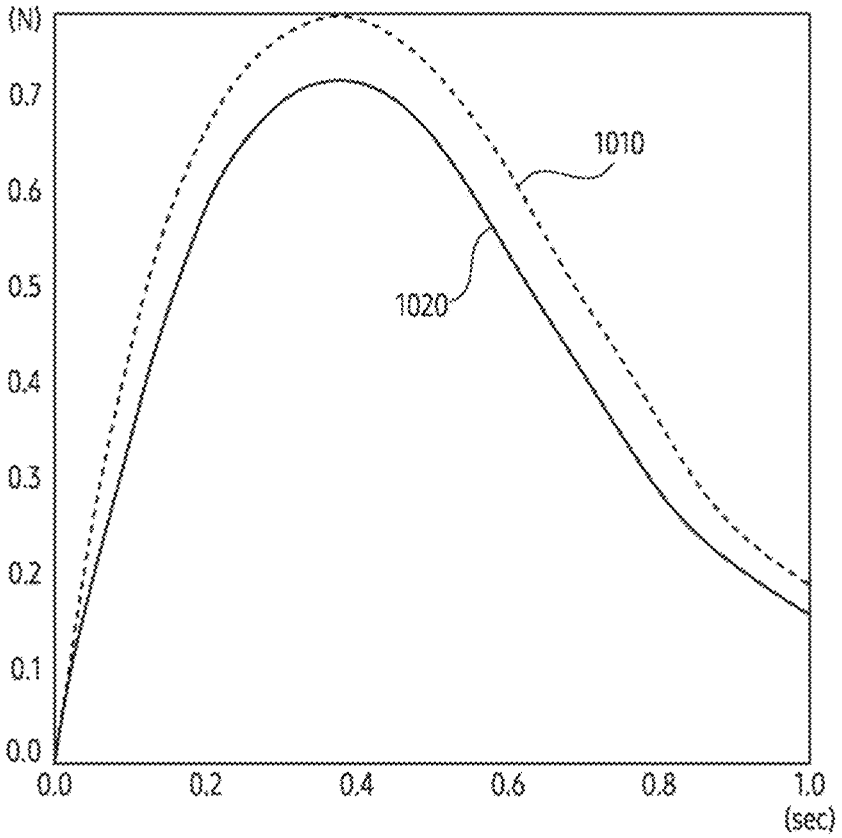
FIG. 10 is a graph illustrating a repulsive force of a support plate.
Figure 11:
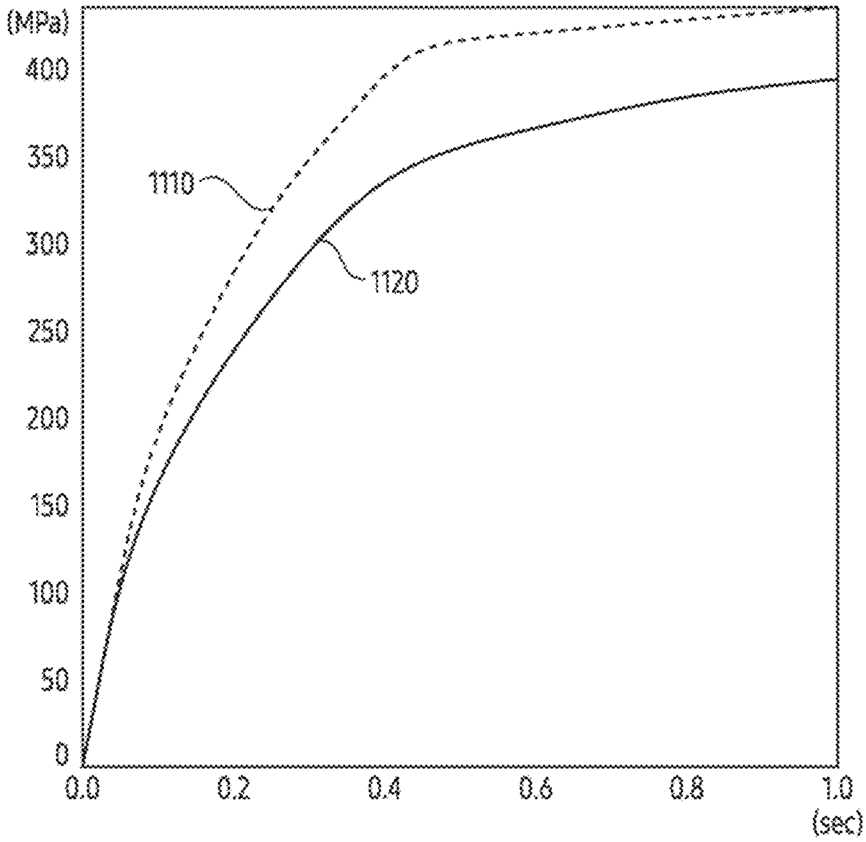
FIG. 11 is a graph illustrating an inner stress of a support plate.

FIG. 10 is a graph illustrating a repulsive force of a support plate. FIG. 11 is a graph illustrating an inner stress of a support plate.

Referring to FIG. 10, a graph 1010 indicates a repulsive force, which is a comparison target of a support plate (e.g., the support plate 410 of FIG. 8) according to one or more embodiments, generated by a bending of the support plate 410 or a force applied to the support plate 410. A graph 1020 indicates a repulsive force generated by a bending of the support plate 410 or a force applied to the support plate 410, according to one or more embodiments.

The horizontal axis means a time elapsed from a time point when a force is applied to the support plate 410 that is a target object. A unit of the horizontal axis may be a second. The vertical axis indicates magnitude of a repulsive force caused by bending of the support plate 410 that is the target object.

Referring to the graph 1010, when a support plate having a bridge with a vertical side surface and without a groove is bent or a force of 1N is applied to the support plate 410, a maximum value of a repulsive force caused from the support plate may be 0.78N. A repulsive force after 0.4 seconds after a force is applied to the support plate may be 0.78 N that is the maximum value.

Referring to the graph 1020, when the support plate 410 having a bridge (e.g., the bridges 421 of FIG. 8) with an inclined side surface and a formed groove is bent or a force of 1N is applied to the support plate 410, a maximum value of a repulsive force caused from the support plate may be 0.74 N. A repulsive force after 0.4 seconds after a force is applied to the support plate 410 may be 0.74 N that is the maximum value.

The support plate 410 including a bridge with an inclined side surface and a formed groove may reduce a repulsive force due to bending by approximately 4%.

Referring to FIG. 11, a graph 1110 indicates a stress, which is a comparison target of a support plate (e.g., the support plate 410 of FIG. 8) according to one or more embodiments, generated by a bending of the support plate 410 or a force applied to the support plate 410. A graph 1120 indicates a stress generated by bending of the support plate 410 or a force applied to the support plate 410, according to one or more embodiments.

The horizontal axis means a time elapsed from a time point when a force is applied to the support plate 410 that is a target object. A unit of the horizontal axis may be a second. The vertical axis indicates magnitude of a stress caused by bending of the support plate 410 that is the target object.

Referring to the graph 1110, when a support plate having a bridge with a vertical side surface and without a groove is bent, a maximum value of a stress caused from the support plate may be 425.8 MPa. A stress after 0.4 seconds after a force is applied to the support plate may be 425.8 MPa that is the maximum value.

Referring to the graph 1120, a maximum value of a stress caused from the support plate as the support plate 410 having a bridge (e.g., the bridges 421 of FIG. 8) with an inclined side surface and a formed groove is bent may be 385.9 MPa. A stress after 0.4 seconds after a force is applied to the support plate 410 may be 385.9 MPa that is the maximum value.

The support plate 410 including a bridge with an inclined side surface and a formed groove may reduce a stress due to bending by approximately 10%.

According to the above-described embodiment, a support plate (e.g., the support plate 410 of FIG. 5, the support plate 700 of FIG. 7, and the support plate 800 of FIG. 8) may provide a structure for minimizing a repulsive force of the support plate and distributing an inner stress.

According to the above-described embodiment, an electronic device (e.g., the electronic device 300 of FIG. 4A) may comprise: a first housing (e.g., the first housing 310 of FIG. 4A); a second housing (e.g., the second housing 320 of FIG. 4A) movably connected to the first housing; a support plate (e.g., the support plate 410 of FIG. 4A) comprising a flexible region, the flexible region (e.g., the lattice region 510 of FIG. 5) comprising a plurality of flexible portions and a plurality of rigid portions (e.g., the rigid portion 425 of FIG. 4A) integrally formed with the flexible portions; and a display (e.g., the display 330 of FIG. 4A) supported by the support plate. Each of the flexible portions may comprise a plurality of slits (e.g., the plurality of slits 411 of FIG. 4A). A first width of at least one of the plurality of slits may be wider than a second width of at least one of the plurality of slits. The first width of the at least one of the plurality of slits may correspond a first side of the plurality of slits closer to the display. The second width of the at least one of the plurality of slits may correspond to a second side of the plurality of slits opposite to the first side.

According to one or more embodiments, the plurality of slits may be filled with resin material.

According to one or more embodiments, the first width of the at least one of the plurality of slits may be 10% to 30% wider than the second width of the at least one of the plurality of slits.

According to one or more embodiments, the first width of the at least one of the plurality of slits may be 20% to 25% wider than the second width of the at least one of the plurality of slits.

According to one or more embodiments, the second housing may be rotatably connected to the first housing. The display may be configured to be folded or unfolded by rotation of the second housing with respect to the first housing.

According to one or more embodiments, the second housing may be configured to move relative to the first housing in a first direction or a second direction opposite to the first direction. A portion of the display, visually exposed to an outside of the electronic device, may be increased by movement of the second housing in the first direction or reduced by movement of the second housing in the second direction.

According to one or more embodiments, the display may include a first region (e.g., the first region 330*a* of FIG. 4A) on the second housing and a second region (e.g., the second region 330*b* of FIG. 4A) that is the portion of the display visually exposed to the outside of the electronic device. The second region of the display may be configured to bend according to deformation of the display.

According to one or more embodiments, a width of at least one of the plurality of rigid portions corresponding to a side of the rigid portion closer to the display may be narrower than a width of the at least one of the plurality of rigid portions corresponding to another side of the rigid portion opposite to the side of the at least one of the plurality of rigid portions.

According to one or more embodiments, the electronic device may further comprise a plurality of support bars on the plurality of rigid portions, respectively. A width of at least one of the plurality support bars may correspond to the width of the at least one of the plurality of rigid portions corresponding to the another side of the at least one rigid portion.

According to one or more embodiments, the width of the support bar may be wider than the width of the at least one of the plurality rigid portions corresponding to the side of the at least one of the plurality of the rigid portions closer to the display.

According to one or more embodiments, the plurality of slits may comprise a first slit and a second slit, wherein the second slit is spaced apart from the first slit in the first direction. The support plate may further comprise a bridge (e.g., the bridge 425 of FIG. 5A) between the first slit and the second slit, the bridge comprising a groove (e.g., the groove 810 of FIG. 8) on a surface of the bridge opposite another surface of the bridge facing the display.

According to one or more embodiments, the bridge may define a portion of the first slit and a portion of the second slit, and extends in a third direction perpendicular to the first direction.

According to one or more embodiments, the groove may extend in the third direction perpendicular to the first direction.

According to one or more embodiments, a width of the another surface of the bridge facing the display may be narrower than a width of the surface of the bridge.

According to one or more embodiments, the support plate may comprise a continuous surface in a region corresponding to the first region. The plurality of flexible portions and the plurality of rigid portions may be alternately arranged in the flexible region. The flexible region may correspond to the second region.

According to one or more embodiments, each of the plurality of slits may comprise a first sidewall extending in a third direction perpendicular to the first direction and a second sidewall opposite to the first sidewall. The first sidewall may have a first slope relative to a surface of the support plate. The second sidewall may have a second slope relative to the surface of the support plate.

According to one or more embodiments, for each of the plurality of slits, the first slope may be symmetrical with the second slope relative to an imaginary line extending in a longitudinal direction of the respective slit.

According to one or more embodiments, the first width may widen when the flexible region is bent. The second width may narrow when the flexible region is bent.

According to one or more embodiments, the support plate may comprise at least one of a polymer, a reinforced plastic, or metal.

According to the above-described embodiment, an electronic device (e.g., the electronic device 300 of FIG. 4A) may comprise: a first housing (e.g., the first housing 310 of FIG. 4A); a second housing (e.g., the second housing 320 of FIG. 4A) movably connected to the first housing, wherein the second housing is configured to move relative to the first housing in a first direction and in a second direction opposite to the first direction; a support plate (e.g., the support plate 410 of FIG. 4A) comprising a flexible region (e.g., the lattice region 510 of FIG. 5), the flexible region comprising a flexible portion and a rigid portion (e.g., the rigid region 520 of FIG. 5) integrally formed with the flexible portion; and a display (e.g., the display 330 of FIG. 4A) supported by the support plate. The flexible portion may comprise a plurality of slits (e.g., the plurality of slits 411 of FIG. 4A). The plurality of slits may comprise a first slit and a second slit. The second slit may be spaced apart from the first slit in the first direction. The support plate may further comprise a bridge (e.g., the bridge 425 of FIG. 5A) between the first slit and the second slit. The bridge may comprise a groove (e.g., the groove 810 of FIG. 8) on a surface of the support plate opposite another surface of the support plate facing the display.

According to the above-described embodiment, an electronic device (e.g., the electronic device 300 of FIG. 4A) may include a first housing (e.g., the first housing 310 of FIG. 4A) and a second housing (e.g., the second housing 320 of FIG. 4A). The second housing may be slidably coupled to the first housing in a first direction or a second direction opposite to the first direction. According to one or more embodiments, the electronic device may further comprise a display (e.g., the display 330 of FIG. 4A). The display may be exposed to an outside of the electronic device, and may include a first region (e.g., the first region 330*a* of FIG. 4A) disposed on the second housing and a second region (e.g., the second region 330*b* of FIG. 4A) enlarged according to movement of the second housing in the first direction or reduced according to movement of the second housing in the second direction. The electronic device may further comprise a support plate (e.g., the support plate 410 of FIG. 4A). The support plate may include a flexible region (e.g., the lattice region 510 of FIG. 5) within a region corresponding to the second region and a rigid region (e.g., the rigid region 520 of FIG. 5) in contact with the flexible region. The support plate may include a plurality of slits (e.g., the plurality of slits 411 of FIG. 4A) disposed under the flexible region of the flexible region and the rigid region and a rigid portion (e.g., the rigid portion 425 of FIG. 4A) in contact with a portion of the plurality of slits and disposed under the rigid region of the flexible region and the rigid region. According to one or more embodiments, a first width of each of the plurality of slits facing the display may be wider than a second width of each of the plurality of slits facing an inside of the electronic device.

According to one or more embodiments, the flexible region may be configured to be changed to correspond to a shape of the deformed display.

According to one or more embodiments, a width of the rigid portion facing the display may be narrower than a width of the rigid portion facing the inside of the electronic device.

According to one or more embodiments, the electronic device includes a support bar contacting a surface of the rigid region.

According to one or more embodiments, the width of the support bar may be equal to or less than a width of the rigid portion in the rigid region facing the inside of the electronic device.

According to one or more embodiments, a width of the rigid portion in the rigid region facing the inside of the electronic device may be wider than a width of the rigid portion in the rigid region facing the display.

According to one or more embodiments, the plurality of slits may be spaced apart from each other in a first direction (e.g., the first direction (+y direction) of FIG. 5) or a third direction (−x direction).

According to one or more embodiments, the support plate may include a bridge (e.g., the bridge 425 of FIG. 5A). The bridge may be disposed between the plurality of slits in the flexible region. The bridge may include a groove (e.g., the groove 810 of FIG. 8). The groove may be disposed a surface facing the inside of the electronic device.

According to one or more embodiments, the bridge may contact a portion of the plurality of slits. the bridge may extend in a third direction perpendicular to the first direction and parallel to a surface of the support plate.

According to one or more embodiments, the groove may extend in a third direction perpendicular to the first direction and parallel to a surface of the support plate.

According to one or more embodiments, a width of a surface of the bridge facing the display may be narrower than a width of another surface of the bridge facing an inside of the electronic device.

According to one or more embodiments, the support plate may include a continuous surface in a region corresponding to the first region.

According to one or more embodiments, the support plate may include the flexible region and the rigid region disposed alternatively in a region corresponding to the second region.

According to one or more embodiments, each of the plurality of slits may include a first sidewall extending in a third direction perpendicular to the first direction and parallel to the support plate and a second sidewall opposite to the first sidewall.

According to one or more embodiments, the first sidewall may have a first slope relative to a surface of the support plate.

According to one or more embodiments, the second sidewall may have a second slope relative to a surface of the support plate.

According to one or more embodiments, the first slope may be symmetrical with the second slope based on an imaginary line extending in a longitudinal direction of each of the plurality of slits.

According to one or more embodiments, the first width may widen when the flexible region is bent.

According to one or more embodiments, the second width may narrow when the flexible region is bent.

According to one or more embodiments, the flexible region and the rigid region may be disposed in an inner space provided by the first housing and the second housing, in a first state in which the second housing is movable in the first direction of the first direction and the second direction.

According to one or more embodiments, the flexible region and the rigid region may be disposed on the first housing in a second state in which the second housing is movable in the second direction of the first direction and the second direction.

According to one or more embodiments, the support plate may include at least one of a polymer, a reinforced plastic, or metal.

According to one or more embodiments, the electronic device (e.g., the electronic device 300 of FIG. 4A) may comprise a first housing 310, a second housing 320 movably connected relative to the first housing in a first direction and in a second direction opposite to the first direction, and a display (e.g., the display 330 of FIG. 4A) exposed to an outside of the electronic device, including a first region (e.g., the first region 330*a* of FIG. 4A) disposed on the second housing and a second region (e.g., the second region 330*b* of FIG. 4A) enlarged according to movement of the second housing in the first direction or reduced according to movement of the second housing in the second direction. According to one or more embodiments, the electronic device may comprise a support plate including a plurality of slits (e.g., the plurality of slits 411 of FIG. 5) disposed under a flexible region (e.g., the flexible region 400*a* of FIG. 5) of the flexible region and a rigid region (e.g., the rigid region 400*b* of FIG. 5) in contact with the flexible region in a portion supporting the second region and a rigid portion (e.g., the rigid portion 425 of FIG. 4A) in contact with a portion of the plurality of slits and disposed under the rigid region of the flexible region and the rigid region.

According to one or more embodiments, the plurality of slits may include a second slit spaced apart from a first slit in the first direction. The support plate may include a bridge (e.g., the bridges 421 of FIG. 4A) including a groove (e.g., groove 810 of FIG. 8) disposed a surface facing an inside of the electronic device, the bridge disposed between the first slit and the second slit in the flexible region.

According to one or more embodiments, the groove may extend in a third direction parallel to a longitudinal direction of the bridge.

According to one or more embodiments, a width of a surface of the bridge facing the display may be different from a width of another surface of the bridge facing an inside of the electronic device.

According to one or more embodiments, the support plate may include at least one of a polymer, a reinforced plastic, or metal.

According to one or more embodiments, the flexible region is configured to be capable of bending according to deformation of the display.

According to one or more embodiments, a width of the rigid portion facing the display may be narrower than a width of the rigid portion facing an inside of the electronic device.

According to one or more embodiments, the electronic device may further comprise a support bar disposed on the rigid region.

According to one or more embodiments, a width of the support bar may correspond to a width of the rigid portion in the rigid region facing an inside of the electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to one or more embodiments of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

No claim element is to be construed under the provisions of 35 U.S.C. § 112, sixth paragraph, unless the element is expressly recited using the phrase "means for" or "means."

What is claimed is:

1. An electronic device comprising:

a first housing;

a second housing movably connected to the first housing;

a support plate comprising a flexible region, the flexible region comprising a plurality of flexible portions and a plurality of rigid portions integrally formed with the flexible portions; and a display supported by the support plate, wherein each of the flexible portions comprises a plurality of slits, wherein a first width of at least one of the plurality of slits is wider than a second width of at least one of the plurality of slits, and wherein the first width of the at least one of the plurality of slits corresponds a first side of the plurality of slits closer to the display and the second width of the at least one of the plurality of slits corresponds to a second side of the plurality of slits opposite to the first side.

2. The electronic device of claim 1, wherein the plurality of slits are filled with resin material.

3. The electronic device of claim 1, wherein the first width of the at least one of the plurality of slits is 10% to 30% wider than the second width of the at least one of the plurality of slits.

4. The electronic device of claim 1, wherein the first width of the at least one of the plurality of slits is 20% to 25% wider than the second width of the at least one of the plurality of slits.

5. The electronic device of claim 1, wherein the second housing is rotatably connected to the first housing, and wherein the display is configured to be folded or unfolded by rotation of the second housing with respect to the first housing.

6. The electronic device of claim 1, wherein the second housing is configured to move relative to the first housing in a first direction or a second direction opposite to the first direction, and wherein a portion of the display, visually exposed to an outside of the electronic device, is increased by movement of the second housing in the first direction or reduced by movement of the second housing in the second direction.

7. The electronic device of claim 6, wherein the display includes a first region on the second housing and a second region that is the portion of the display visually exposed to the outside of the electronic device, and wherein the second region of the display is configured to bend according to deformation of the display.

8. The electronic device of claim 7, wherein a width of at least one of the plurality of rigid portions corresponding to a side of the rigid portion closer to the display is narrower than a width of the at least one of the plurality of rigid portions corresponding to another side of the rigid portion opposite to the side of the at least one of the plurality of rigid portions.

9. The electronic device of claim 7, further comprising a plurality of support bars on the plurality of rigid portions, respectively, wherein a width of at least one of the plurality support bars corresponds to the width of the at least one of the plurality of rigid portions corresponding to the another side of the at least one rigid portion.

10. The electronic device of claim 9, wherein the width of the support bar is wider than the width of the at least one of the plurality rigid portions corresponding to the side of the at least one of the plurality of the rigid portions closer to the display.

11. The electronic device of claim 7, wherein the plurality of slits comprise a first slit and a second slit, wherein the second slit is spaced apart from the first slit in the first direction, and wherein the support plate further comprises a bridge between the first slit and the second slit, the bridge comprising a groove on a surface of the bridge opposite another surface of the bridge facing the display.

12. The electronic device of claim 11, wherein the bridge defines a portion of the first slit and a portion of the second slit, and extends in a third direction perpendicular to the first direction.

13. The electronic device of claim 12, wherein the groove extends in the third direction perpendicular to the first direction.

14. The electronic device of claim 12, wherein a width of the another surface of the bridge facing the display is narrower than a width of the surface of the bridge.

15. The electronic device of claim 7, wherein the support plate comprises a continuous surface in a region corresponding to the first region, wherein the plurality of flexible portions and the plurality of rigid portions are alternately arranged in the flexible region, and wherein the flexible region corresponds to the second region.

16. The electronic device of claim 7, wherein each of the plurality of slits comprises a first sidewall extending in a third direction perpendicular to the first direction and a second sidewall opposite to the first sidewall, wherein the first sidewall has a first slope relative to a surface of the support plate, and wherein the second sidewall has a second slope relative to the surface of the support plate.

17. The electronic device of claim 16, wherein, for each of the plurality of slits, the first slope is symmetrical with the second slope relative to an imaginary line extending in a longitudinal direction of the respective slit.

18. The electronic device of claim 1, wherein the first width widens when the flexible region is bent, and wherein the second width narrows when the flexible region is bent.

19. The electronic device of claim 1, wherein the support plate comprises at least one of a polymer, a reinforced plastic, or metal.

20. An electronic device comprising:

a first housing;

a second housing movably connected to the first housing, wherein the second housing is configured to move relative to the first housing in a first direction and in a second direction opposite to the first direction;

a support plate comprising a flexible region, the flexible region comprising a flexible portion and a rigid portion integrally formed with the flexible portion; and a display supported by the support plate, wherein the flexible portion comprises a plurality of slits, wherein the plurality of slits comprises a first slit and a second slit, wherein the second slit is spaced apart from the first slit in the first direction, wherein the support plate further comprises a bridge between the first slit and the second slit, and wherein the bridge comprises a groove on a surface of the support plate opposite another surface of the support plate facing the display.

* * * * *